(12) United States Patent
Kim et al.

(10) Patent No.: US 9,854,650 B2
(45) Date of Patent: Dec. 26, 2017

(54) LIGHTING SYSTEM, LIGHTING DEVICE, AND CONTROL METHOD THEREOF

(71) Applicant: SAMSUNG ELECTRONICS CO., LTD., Suwon-si (KR)

(72) Inventors: Chang Seob Kim, Seoul (KR); Chang Hoon Baek, Suwon-si (KR); Ho Chan Cho, Suwon-si (KR); Seung Kwan Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/228,576

(22) Filed: Aug. 4, 2016

(65) Prior Publication Data

US 2017/0171949 A1    Jun. 15, 2017

(30) Foreign Application Priority Data

Dec. 11, 2015  (KR) .................. 10-2015-0177046

(51) Int. Cl.
| | |
|---|---|
| *H05B 37/02* | (2006.01) |
| *F21V 29/74* | (2015.01) |
| *F21K 9/275* | (2016.01) |
| *F21K 9/278* | (2016.01) |
| *F21K 9/238* | (2016.01) |
| *F21K 9/235* | (2016.01) |
| *F21V 7/00* | (2006.01) |
| *F21V 19/00* | (2006.01) |

(Continued)

(52) U.S. Cl.
CPC ......... *H05B 37/0272* (2013.01); *F21K 9/235* (2016.08); *F21K 9/238* (2016.08); *F21K 9/275* (2016.08); *F21K 9/278* (2016.08); *F21V 7/0008* (2013.01); *F21V 19/006* (2013.01); *F21V 23/005* (2013.01); *F21V 29/74* (2015.01); *H04B 5/0031* (2013.01); *H04B 10/502* (2013.01); *H04W 4/008* (2013.01); *H05B 33/0854* (2013.01); *H05B 37/0218* (2013.01); *H05B 37/0227* (2013.01); *F21Y 2115/10* (2016.08)

(58) Field of Classification Search
None
See application file for complete search history.

(56) References Cited

U.S. PATENT DOCUMENTS

| | | |
|---|---|---|
| 6,372,608 B1 | 4/2002 | Shimoda et al. |
| 6,645,830 B2 | 11/2003 | Shimoda et al. |

(Continued)

FOREIGN PATENT DOCUMENTS

| | | |
|---|---|---|
| JP | 2007-66585 A | 3/2007 |
| KR | 10-2008-0026126 A | 3/2008 |

(Continued)

*Primary Examiner* — Crystal L Hammond
(74) *Attorney, Agent, or Firm* — Sughrue Mion, PLLC

(57) ABSTRACT

A lighting system includes a plurality of lighting devices including a controller transmitting and receiving data by using near field communications (NFC) The lighting system further includes a control device that collects identification information for the plurality of respective lighting devices through the NFC communications before the plurality of lighting devices are installed. The control device also generates settings data to control the plurality of lighting devices, based on the identification information, and then transmits the generated settings data to the plurality of respective lighting devices.

20 Claims, 16 Drawing Sheets

(51) Int. Cl.
*F21V 23/00* (2015.01)
*H04B 5/00* (2006.01)
*H04B 10/50* (2013.01)
*H04W 4/00* (2009.01)
*H05B 33/08* (2006.01)
*F21Y 115/10* (2016.01)

(56) References Cited

U.S. PATENT DOCUMENTS

| | | | |
|---|---|---|---|
| RE38,466 E | 3/2004 | Inoue et al. |
| 6,818,465 B2 | 11/2004 | Biwa et al. |
| 6,818,530 B2 | 11/2004 | Shimoda et al. |
| 6,858,081 B2 | 2/2005 | Biwa et al. |
| 6,967,353 B2 | 11/2005 | Suzuki et al. |
| 7,002,182 B2 | 2/2006 | Okuyama et al. |
| 7,084,420 B2 | 8/2006 | Kim et al. |
| 7,087,932 B2 | 8/2006 | Okuyama et al. |
| 7,154,124 B2 | 12/2006 | Han et al. |
| 7,208,725 B2 | 4/2007 | Sherrer et al. |
| 7,288,758 B2 | 10/2007 | Sherrer et al. |
| 7,319,044 B2 | 1/2008 | Han et al. |
| 7,501,656 B2 | 3/2009 | Han et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,093,817 B2 | 1/2012 | Frumau et al. |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,381,981 B2 | 2/2013 | Fowler et al. |
| 8,399,944 B2 | 3/2013 | Kwak et al. |
| 8,432,511 B2 | 4/2013 | Jeong |
| 8,459,832 B2 | 6/2013 | Kim |
| 8,502,242 B2 | 8/2013 | Kim |
| 8,536,604 B2 | 9/2013 | Kwak et al. |
| 8,735,931 B2 | 5/2014 | Han et al. |
| 8,766,295 B2 | 7/2014 | Kim |
| 9,519,901 B1* | 12/2016 | Dorogusker | G06Q 20/202 |
| 2007/0121323 A1 | 5/2007 | Pawlik et al. |
| 2008/0211427 A1 | 9/2008 | Budde et al. |
| 2010/0309016 A1 | 12/2010 | Wendt et al. |
| 2012/0315848 A1* | 12/2012 | Smith | H04B 5/02 |
| | | | 455/41.1 |
| 2013/0141011 A1* | 6/2013 | Fushimi | H05B 37/02 |
| | | | 315/294 |
| 2013/0303085 A1* | 11/2013 | Boucher | H04W 4/008 |
| | | | 455/41.1 |
| 2014/0089113 A1* | 3/2014 | Desai | G06Q 20/322 |
| | | | 705/16 |
| 2015/0029206 A1* | 1/2015 | Bialota | G06T 11/00 |
| | | | 345/589 |
| 2015/0061541 A1* | 3/2015 | Gandini | A01K 63/06 |
| | | | 315/294 |
| 2015/0163744 A1* | 6/2015 | Suh | H04W 52/0235 |
| | | | 370/311 |
| 2016/0212831 A1* | 7/2016 | Dobai | H05B 37/0272 |
| 2016/0259329 A1* | 9/2016 | High | G06T 7/593 |
| 2016/0270192 A1* | 9/2016 | Kim | H05B 33/0863 |
| 2016/0278186 A1* | 9/2016 | Van De Sluis | H05B 33/0863 |
| 2016/0309570 A1* | 10/2016 | Han | H05B 33/0815 |
| 2016/0323972 A1* | 11/2016 | Bora | H05B 33/0842 |

FOREIGN PATENT DOCUMENTS

| | | |
|---|---|---|
| KR | 10-2010-0120292 A | 11/2010 |
| KR | 10-2014-0122908 A | 10/2014 |
| KR | 10-2015-0006642 A | 1/2015 |
| KR | 10-1516662 B1 | 5/2015 |

\* cited by examiner

LIGHTING SYSTEM, LIGHTING DEVICE, AND CONTROL METHOD THEREOF

CROSS-REFERENCE TO RELATED APPLICATION

This application claims priority from Korean Patent Application No. 10-2015-0177046 filed on Dec. 11, 2015 in the Korean Intellectual Property Office, the disclosure of which is incorporated herein by reference in its entirety.

BACKGROUND

1. Field

The present disclosure relates to a lighting system, a lighting device, and a control method thereof.

2. Description of Related Art

As lighting technology converges with various aspects of information technology, research into smart lighting technology, in which various types of illumination may be implemented according to an external environment or setting by a user, has been actively conducted. In smart lighting technology, a plurality of lighting devices installed in a specific area are respectively identified and distinguished from each other based on predetermined identification information, and different commands may be transmitted to the plurality of lighting devices using wired/wireless communications technology or Internet-of-Things (IoT) technology, to implement various lighting schemes, control illumination per channel and space, and the like.

SUMMARY

Example embodiments provide a lighting system, a lighting device, and a control method thereof, by which identification information given to a plurality of lighting devices included in a lighting system is collected by a control device based on near field communication (NFC) technology, thereby increasing convenience of installation of a plurality of lighting devices and improving security while discouraging malicious hacking attempts.

According to an aspect of an example embodiment, a lighting system may include a plurality of lighting devices. Each of the plurality of lighting devices may include a controller configured to transmit and receive data by using near field communications (NFC); and a control device configured to collect identification information of each of the plurality of lighting devices through the NFC communications prior to the plurality of lighting devices being installed; based on the identification information, generate settings data for controlling the plurality of lighting devices; and transmit the settings data to each of the plurality of lighting devices.

According to an aspect of another example embodiment, a lighting device may include: a light source including a plurality of light emitting elements; a driving circuit configured to output driving power to the light source; and a controller configured to control the driving circuit. The controller may include a near-field communication (NFC) tag communicating with an external control device through NFC and storing predetermined identification information. The controller may be further configured to transmit the predetermined identification information stored in the NFC tag to the external control device through the NFC when the controller receives a request for the predetermined identification information from the external control device.

According to an aspect of another example embodiment, a method of controlling a lighting device may include: reading identification information of each of a plurality of lighting devices through near-field communication (NFC) prior to the plurality of lighting devices being installed; mapping the identification information to installation information of the each of the plurality of lighting devices; based on the mapped identification information, generating settings data for controlling the plurality of lighting devices; and transmitting the settings data to at least one of the plurality of lighting devices through the NFC.

According to an aspect of another example embodiment, a control device for a lighting system may include: a near-field communication (NFC) module configured to receive identification information of each of a plurality of lighting devices and transmit settings data to the each of the plurality of lighting devices by using an NFC, wherein the plurality of lighting devices are prior to receive power; a memory configured to store installation information for the plurality of lighting devices; and a processor configured to generate the settings data by mapping the identification information to installation information of the each of the plurality of lighting devices.

BRIEF DESCRIPTION OF DRAWINGS

The above and/or other aspects, features and other advantages of the present disclosure will be more clearly understood from the following detailed description taken in conjunction with the accompanying drawings, in which.

DETAILED DESCRIPTION

Hereinafter, example embodiments will be described as follows with reference to the attached drawings.

Figure 1:
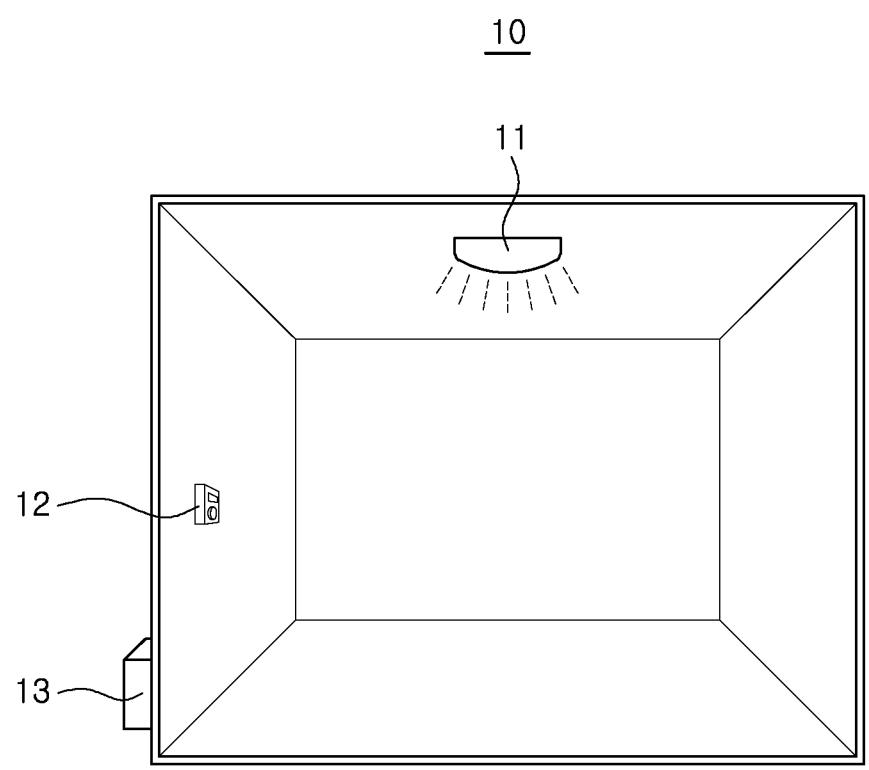
FIG. 1 is a schematic view of a lighting device according to an example embodiment.

FIG. 1 is a schematic view of a lighting device according to an example embodiment.

With reference to FIG. 1, a lighting device 10 according to an example embodiment may be installed in an interior space of a building. The lighting device 10 may include a light source 11, a controller 12, a sensor 13, and the like. The sensor 13 may be provided in an internal space or externally in an environment where the lighting device 10 is installed. The sensor 13 may be a humidity sensor, an illumination sensor, a temperature sensor, a motion sensor, or the like. The controller 12 may control operations of the light source 11 according to environmental information collected by the sensor 13.

For example, when the sensor 13 includes an illumination sensor, the controller 12 may decrease brightness of the light source 11 automatically in a case in which an amount of ambient light sensed by the illumination sensor is relatively high (e.g., above a predetermined threshold). In a different manner, for example, when an amount of ambient light sensed by the illumination sensor is relatively low (e.g., below a predetermined threshold), the controller 12 may increase the brightness of the light source 11 automatically. In another example embodiment, the controller 12 may decrease the brightness of the light source 11 automatically when an amount of ambient light sensed by the illumination sensor is relatively low, in order to save power consumption.

In addition, for example, when the sensor 13 includes a motion sensor, the sensor 13 may be installed over a doorway or around a window in an internal space in which the lighting device 10 is installed, to thus sense motion. When an external motion sensor is activated, for example, the controller 12 may issue a warning or the like to a user by flickering the light source 11.

The light source 11 may include a single light emitting element or a plurality of light emitting elements. Light emitting elements included in the light source 11 may be used for illumination, and may be white light emitting elements according to an example embodiment. The plurality of light emitting elements may be arranged in an array form, and in order to monitor an operation state of the light source 11, an illumination sensor may be further provided in the light source 11. The plurality of light emitting elements included in the light source 11 may be mounted on a circuit board or the like. A driving circuit to supply driving power to the plurality of light emitting elements may be provided on the circuit board.

The controller 12 may be an apparatus for controlling operations of the light source 11, and may be implemented by an integrated circuit chip or the like. The controller 12 may include, for example, one or more central processing units (CPUs), a memory, a storage device, interfaces, etc. The controller 12 may be provided for a user in a form of a control panel including a switch for on/off switching of the light source 11, a dimming dial for controlling brightness of the light source 11, and the like.

In an example embodiment, the controller 12 may include a communications module. The communications module included in the controller 12 may be a module based on various wired/wireless communications protocols, and, as an example, the controller 12 may include various wireless communications modules such as Wi-Fi, wireless local area network (WLAN), radio-frequency identification (RFID), NFC, infrared communications, Bluetooth™, and the like. The controller 12 may be communicatively connected to an external control apparatus through a communications module.

The external control apparatus may be a separate remote controller provided together with the lighting device 10, or a smart device such as a smartphone, a tablet personal computer (PC), a desktop computer, a wearable computing device, or the like. The external control apparatus may be implemented with hardware, software, or a combination of both. The external control apparatus may transmit data for configuration of the lighting device 10 to the controller 12. As an example, when the lighting device 10 is initially installed in a specific space, authentication between an external control apparatus and the lighting device 10 may be required to perform communication between the lighting device 10 and the external control apparatus. The lighting device 10 may include predetermined identification information, and the external control apparatus may receive the identification information from the communications module included in the controller 12 to perform a mutual authentication operation with the controller 12.

For example, when a plurality of lighting devices 10 are controlled by a single external control apparatus, the identification information may be useful for distinguishing between the multiple lighting devices 10. The external control apparatus may collect identification information from the respective lighting devices 10 before the plurality of lighting devices 10 are installed, and may provide installation preparation processes such as grouping of the lighting devices 10, setting of a channel, setting of a lighting scheme, operation setting based on an illumination zone, and the like, based on the collected identification information to a user. For example, when a smart device is used as an external control apparatus, operations such as collection of identification information, an installation preparation process, and the like may be performed by an application program executing on the smart device.

According to an example embodiment, the controller of the lighting device 10 may include a near field communication (NFC) tag. The NFC tag may include a radio frequency (RF) circuit transmitting and receiving data by electromagnetic induction, and an RF memory connected to the RF circuit. Identification information for the lighting device 10 may be stored in the RF memory. The NFC tag stored in the controller 12 may operate as a target device for the external control apparatus that includes an NFC communications module, and may connect to the external control apparatus in an NFC passive communications mode.

For example, when the external control apparatus activates an NFC function therein and then approaches the lighting device 10, the identification information for the lighting device 10 stored in the NFC tag included in the controller 12 may be read therefrom. More specifically, even if the lighting device 10 is in a state in which power is not supplied, because the NFC tag included in the controller 12 may receive power by an electromagnetic field emitted from the external control apparatus to thus operate, the external control apparatus may collect identification information of the lighting device 10 even before the lighting device 10 is installed and connected to a power source. Thus, the external control apparatus may collect identification information for the lighting device 10 in advance, for example, before the lighting device 10 is installed, and based on the collected identification information, may determine the proper configuration for the lighting device 10 in advance. Thus, more convenient and efficient installation of the lighting device 10 may be achieved.

Figure 2:
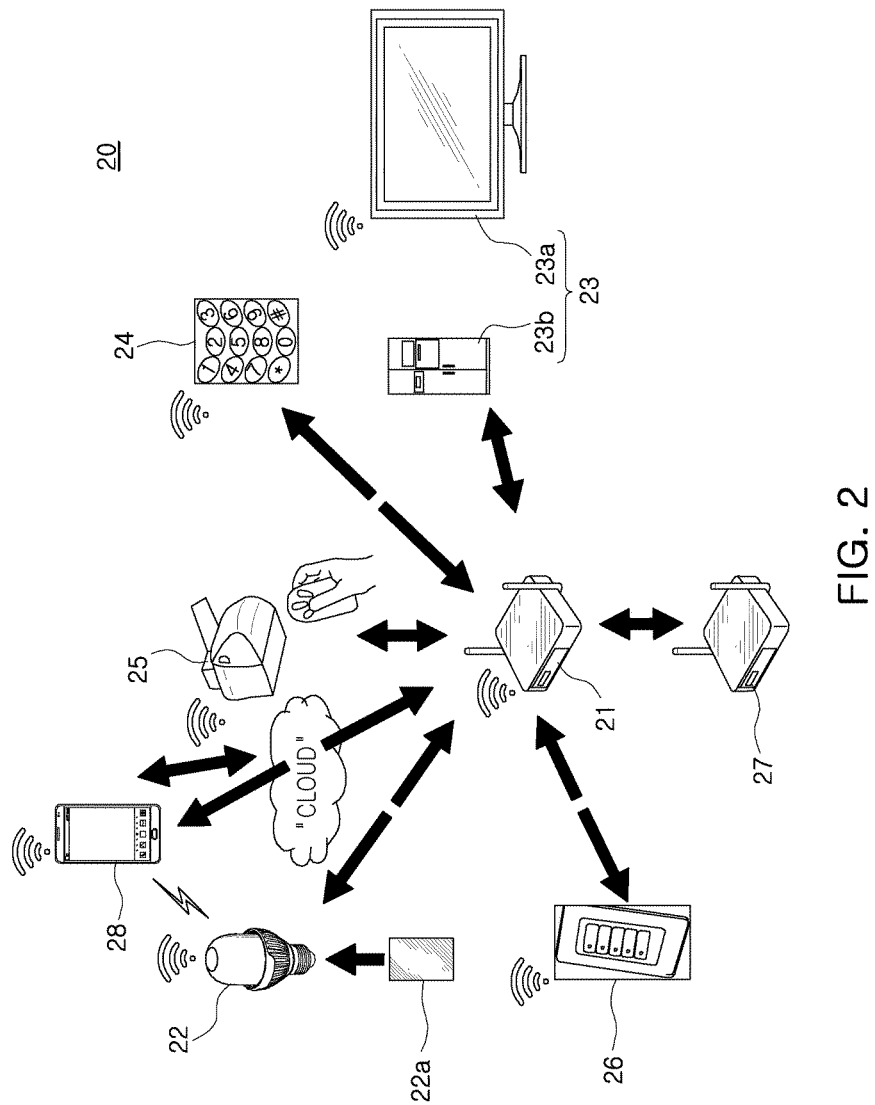
FIGS. 2 and 3 are drawings illustrating near field communication (NFC) between a control device and a lighting device in a lighting system according to an example embodiment.
Figure 3:
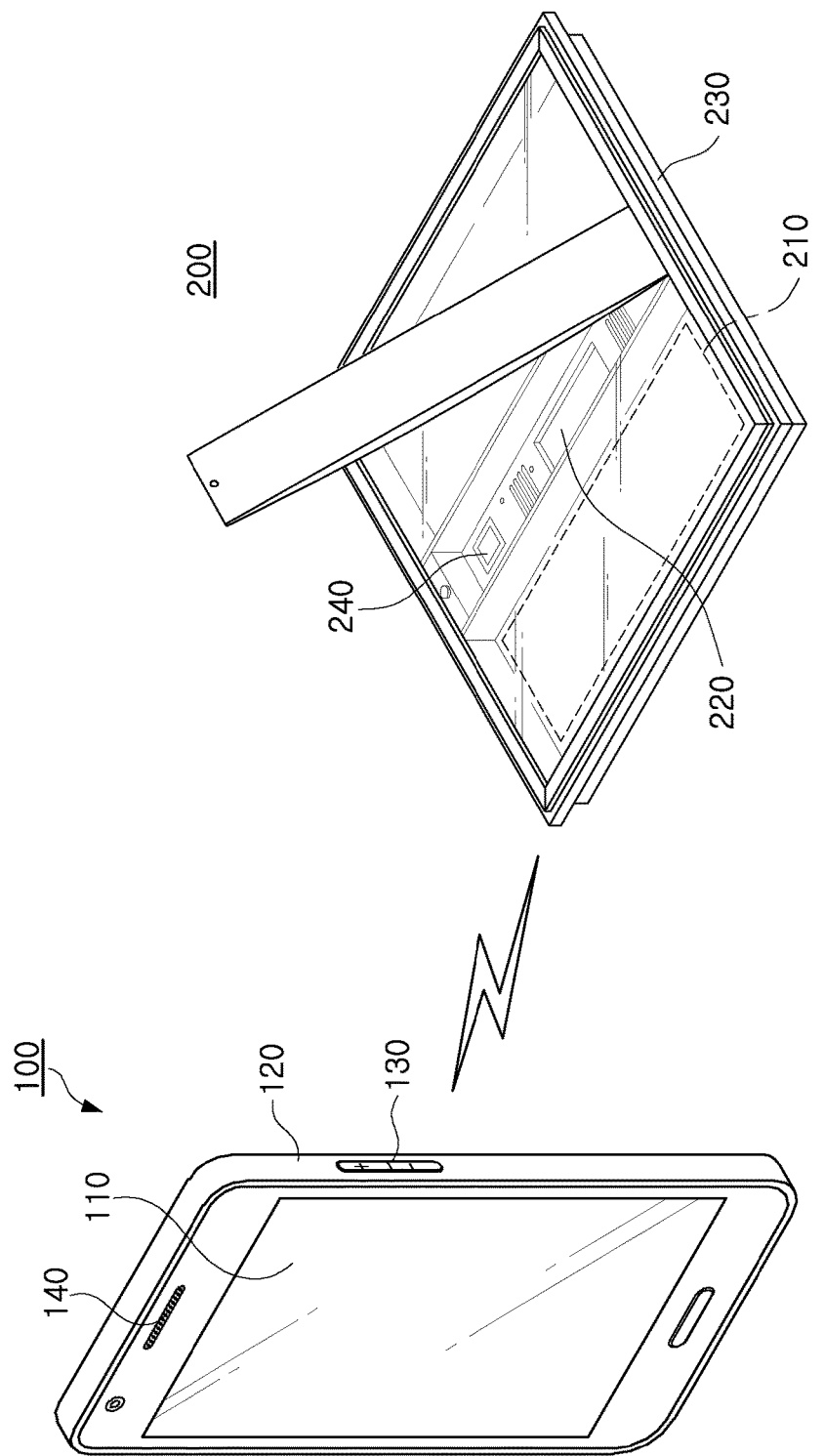

FIGS. 2 and 3 are drawings illustrating near field communication (NFC) between a control device and a lighting device in a lighting system according to an example embodiment.

First, with reference to FIG. 2, a lighting system according to an example embodiment may be employed in a specific interior space. The interior space may be, for example, a room in a residence, a conference room in an office building, a classroom in a school, etc. The lighting system 20 may be deployed in an exterior space as well. The lighting system 20 may be a composite smart lighting network system in which lighting technology using a light emitting device such as a light emitting diode (LED) and the like may converge with other technologies such as Internet-of-Things (IoT) technology, wireless communications technology, and the like. The lighting system 20 may be implemented using various lighting devices and wired/wireless communications devices, and may be implemented by a sensor, a controller, a communications device, software for network control and maintenance, or the like.

The lighting system 20 may be applied to an open space such as parks, roads, and the like as well as closed spaces defined as the interior of a building or structure such as homes, offices, and schools. The lighting system 20 may be implemented based on an IoT environment to collect and process various pieces of information and provide a user with the collected and processed information. In this case, a light-emitting diode (LED) lamp 22 included in the lighting system may receive information regarding an ambient environment from a gateway 21 to control illumination of the LED lamp 22, and may also confirm and control an operating state of other devices 23 to 28 included in the IoT environment, and the like, based on a function such as visible light communications of the LED lamp 22, or the like.

The LED lamp 22 may include a plurality of sensors. The plurality of sensors may collect information regarding an ambient environment of the LED lamp 22, and may also collect information regarding humidity, temperature, intensity of illumination, and the like to monitor an internal state of the LED lamp 22. A control device installed in the LED lamp 22 may collect information regarding operations of the LED lamp 22 as well as information regarding the humidity, temperature, and illumination of the interior of the LED lamp 22, and may periodically store the collected information. In addition, in a case in which an abnormal operation or the like is sensed, the control device may inform a mobile device 28 of a user of the abnormal condition of the LED lamp 22 through the gateway 21. In this case, the mobile device 28 may communicate with the LED lamp 22 through the gateway 21, or may directly communicate with the LED lamp 22 without passing through the gateway 21.

In addition, the mobile device 28 may be provided as a control apparatus controlling operations of the LED lamp 22, and may store identification information for the LED lamp 22 included in the lighting system 20 therein and transmit an operation command to the LED lamp 22, based on the stored identification information. In order to directly communicate with the mobile device 28, the LED lamp 22 may include various types of wired/wireless communications modules.

The lighting system 20 may include a plurality of LED lamps 22. In this case, the LED lamps 22 may be differentiated from each other, based on unique identification information thereof. In other words, each of the LED lamps 22 may be provided with a unique identifier. The mobile device 28, provided as an apparatus for controlling the LED lamp 22 while distinguishing the LED lamps 22 from each other, may collect identification information from the LED lamps 22. In an example embodiment, identification information for the LED lamp 22 may be stored in a memory of an NFC tag included in the LED lamp 22, and an NFC tagging operation may be performed in the LED lamp 22 by the mobile device 28 having an NFC communications function, thereby reading the identification information of the LED lamp 22 therefrom. The NFC tag embedded in the LED lamp 22 may be a target device for the mobile device 28. Thus, the mobile device 28 may collect the identification information even before, for example, the LED lamp 22 is installed and thus power is not yet supplied to the LED lamp 22.

The mobile device 28 may be connected to the gateway 21 through a network or a cloud or directly connected thereto. The mobile device 28 may be communicatively connected through the gateway 21 to an external server including installation information of the LED lamp 22. If the LED lamp 22 is not yet installed, the mobile device 28 may receive the installation information of the LED lamp 22 from the external server, and may collect the identification information of the LED lamp 22 based on the installation information thereof.

The external server may be implemented with a generic server, a desktop computer, or the like. The installation information may include information regarding a position or location in which a lighting device is to be installed within the space to which the lighting system 20 is to be applied, a control command for controlling operations of a lighting device to be installed in a respective position, channel setting information for assigning communications channels for a plurality of lighting devices, lighting zone setting information for grouping one or more lighting devices into lighting zones, and the like. The mobile device 28 may download the installation information from the external server and display the downloaded installation information on a screen through an application program.

A user may select any one position among a plurality of positions in which lighting devices are to be installed while the installation information is displayed on the mobile device 28. Once a position is selected and the mobile device comes within close proximity (e.g., comes within a predetermined distance) to the LED lamp 22, the mobile device 28 may collect identification information from the LED lamp 22 through the NFC, and may match the collected identification information to the selected position. For example, when the identification information of the LED lamp 22 is matched to a specific position, the mobile device 28 may again transmit to the LED lamp 22 through the NFC a control command, channel setting information, lighting zone setting information, and the like to be applied to the lighting device installed in the corresponding position thereof. The transmitted information may be encoded and stored in a memory included in the NFC tag of the LED lamp 22.

With reference to FIG. 2, the lighting system 20 may include the gateway 21 processing data transmitted and received according to different communications protocols; the LED lamp 22 communicatively connected to the gateway 21 and including an LED, a plurality of sensors, and the like; and a plurality of devices 23 to 28 communicatively connected to the gateway 21 according to various wireless communications schemes. The lighting system 20 may be implemented based on an IoT environment, and each of the devices 23 to 28, as well as the LED lamp 22, may include at least one communications module. In an example embodiment, the LED lamp 22 may be connected to the gateway 21 to be able to communicate therewith by a wireless communications protocol such as Wi-Fi, Zigbee®, Li-Fi, Bluetooth™, ultra-wideband (UWB), or the like, and to this end, may include at least one communications module 22a. In addition, as described above, the LED lamp 22 may store unique identification information therein, and may include an NFC tag capable of providing the identification information to an external control apparatus such as the mobile device 28, or the like.

The lighting system 20 may be applied to an open space such as roads or parks as well as a closed space such as homes or offices. For example, when the lighting system 20 is applied to a home, the plurality of devices 23 to 28 included in the lighting system 20 and communicatively connected to the gateway 21 based on an IoT technology may include home appliances 23, a digital door lock 24, a garage door opener 25, a light switch 26 installed on a wall or the like, a router 27 for a wireless communications network relay, and a mobile device 28 such as a smartphone, a tablet PC, a laptop computer, and the like.

In the lighting system 20, the LED lamp 22 may learn of the operating states of various devices 23 to 28 using a wireless communications network installed in a home, such as Zigbee®, Wi-Fi, Light Fidelity (Li-Fi), UWB, Bluetooth™, or the like, or may automatically control illumination intensity of the LED lamp 22 according to an ambient environment and conditions determined by the LED lamp 22. In addition, the devices 23 to 28 included in the lighting system 20 may also be controlled using Li-Fi communications that use visible rays of light emitted from the LED lamp 22.

First, the LED lamp 22 may automatically control illumination intensity thereof based on ambient environmental information transferred from the gateway 21 through the communications module 22a or ambient environmental information collected by a sensor installed in the LED lamp 22. For example, the brightness of the LED lamp 22 may be automatically adjusted according to a type of program broadcast on a television set 23a or the brightness of a screen. To this end, the LED lamp 22 may receive information regarding operation of the television set 23a from the communications module 22a connected to the gateway 21. The communications module 22a may be integrated into the same module with a sensor and/or a controller included in the LED lamp 22.

For example, when the broadcast TV program is a drama, illumination may also have a color temperature of 12000K or less to be appropriate thereto according to a preset value. More specifically, the color temperature may be reduced to 5000K, and a color level may be adjusted to thus provide a comfortable and warm atmosphere. In addition, for example, when a program value corresponds to a comedy, the lighting system 20 may also be configured in such a way that the color temperature may be increased to 5000K or higher according to a predetermined illumination intensity value and adjusted to provide blue-tinted white illumination.

In addition, when a predetermined time elapses after the digital door lock 24 is locked in a state in which no person is in a home, all of the LED lamps 22 that are on may be turned off to, thus reducing power consumption. Alternatively, in a case in which a security mode is preset by the mobile device 28 or the like, when the digital door lock 24 is locked in a state in which no person is in a home, the LED lamp 22 may be periodically turned on for a preset duration of time during the night time according to a usage schedule for the purpose of deterring a potential burglary.

An operation of the LED lamp 22 may also be controlled according to ambient environmental information collected by various sensors connected to the lighting system 20. For example, when the lighting system 20 is implemented in a building, equipment management may be conveniently performed, or idle space may be efficiently used by combining a lighting device, a position sensor, and a communications module in the building to collect people's positional information in the building and switching the lighting device on/off or providing the collected information in real time. In general, because lighting devices such as the LED lamp 22 are typically dispersed throughout the interior spaces of respective floors in a building, information regarding various activities occurring inside the building may be collected through the sensors integrated with the LED lamp 22, and the collected information may be used for management of facilities and utilization of idle spaces thereto, and the like.

In a different manner, the LED lamp 22, an image sensor, a storage device, the communications module 22a, and the like may be combined with one another to thus be used in an apparatus capable of maintaining the security of a building or sensing and dealing with emergencies. For example, when a smoke or temperature sensor or the like is attached to the LED lamp 22, damage may be significantly reduced by quickly sensing whether a fire or the like has occurred. In addition, the brightness of a lighting device may be controlled in consideration of weather or an amount of sunlight, and the like, thereby providing a comfortable illumination environment while also conserving energy.

Operations of the LED lamp 22 described above by way of example may be set up by an application program executable in the mobile device 28. A user may collect identification information for the LED lamp 22 from an NFC tag embedded in the LED lamp 22, even before the lighting system 20 is installed. Thus, settings data for configuration of the LED lamp 22 in advance by the application program may be generated even in a state in which the LED lamp 22 is not installed. The settings data generated in the application program may be executed in the LED lamp 22, after power is supplied to the LED lamp 22 and the LED lamp 22 is thus connected directly to the mobile device 28 or connected to the mobile device 28 through the gateway 21 to be able to communicate therewith. In other words, the settings data may be transmitted to the LED lamp 22 and stored in the LED lamp 22 even before the LED lamp 22 is installed and connected to a power source. The LED lamp 22 may operate according to the settings data received from the mobile device 28, and the settings data may then be updated as needed.

As described above, the lighting system 20 may be applied to an open space such as roads (e.g., street lamps) or parks as well as a closed space such as homes, offices, buildings, and the like. In a case in which the lighting system 20 is applied to an open space without physical limitations, it may be relatively difficult to implement the lighting system 20 due to a distance limitation of wireless communications, a communication interference caused by various obstacles, and the like. Thus, in the case in which the lighting system 20 is applied to an open space, a sensor, a communications module, and the like may be installed inside respective lighting fixtures, and the respective lighting fixtures may be used as an information collecting device and a communications relay device.

FIG. 3 illustrates a control device 100 and a lighting device 200, which may be employed in a lighting system according to an example embodiment. With reference to FIG. 3, the lighting device 200 according to an example embodiment may be a flat lighting apparatus, and the control device 100 may be a smart device on which an application program may be installed and executed. However, the control device 100 and the lighting device 200 are not limited to the illustrations of FIG. 3.

The control device 100 may be one of various smart devices such as a smartphone, a personal digital assistant (PDA), a tablet PC, a laptop computer, and the like. For example, when the control device 100 is a smartphone, the control device 100 may include a display unit 110, a housing 120, a key input unit 130, and the like. Various application programs may be installed and executed in the control device 100. In the application programs executed in the control device 100, an application program capable of reading identification information of the lighting device 200 and generating settings data for controlling the lighting device 200 may be further included.

The lighting device 200 may include a light source 210, a driving circuit 220, a housing 230, and a controller 240. According to an exemplary embodiment, the light source 210 may include a light emitting element array as a light source, and the driving circuit 220 may supply driving power to the light source 210. In an example embodiment, the driving circuit 220 may include a rectifying circuit that converts an alternating current into a direct current (DC), a DC-DC converter circuit that increases or reduces the output voltage from the rectifying circuit to thus supply the driving power to the light source 210, and the like.

The light source 210 may include a light emitting element array, and may be formed to have a substantially flattened shape. The light source 210 and the driving circuit 220 may be accommodated in the housing 230, and the light source 210 may be disposed to emit light in a direction in which the housing 230 is open.

The controller 240 may be provided in a form of an integrated circuit chip, and may control operations of the driving circuit 220. In an example embodiment, when the driving circuit 220 includes a DC-DC converter circuit generating driving power, the controller 240 may control a duty ratio, an operating frequency, and the like of a switching device included in the DC-DC converter circuit to thus control brightness of the light source 210. In addition, the controller 240 may include a communications module communicating with the control device 100, and more specifically, may include an NFC tag in which unique identification information, provided to distinguish the lighting devices 200 from each other, is stored.

The NFC tag included in the controller 240 may be operated in a passive mode to communicate with the control device 100. For example, when an NFC communications function in the control device 100 is activated, the NFC tag included in the controller 240 may be operated using power induced by an electromagnetic field transferred from the control device 100. Thus, even in a state in which the lighting device 200 is not installed or the lighting device 200 does not receive power, the control device 100 may collect identification information of the lighting device 200, and the lighting device 200 may store data received from the control device 100 therein.

The control device 100 may generate settings data for configuring the lighting device 200, based on the identification information collected from the lighting device 200 even before the lighting device 200 is physically installed and/or set up for operation. The settings data may be transmitted to the lighting device 200 through the NFC communications, to be stored therein. Thus, before the lighting device 200 is installed to operate, since registration and setting of a respective lighting device 200 may be performed, the amount of time required for installation of the lighting device 200 may be reduced.

For example, in the case that the control device 100 attempts to collect identification information of the lighting device 200 through the NFC communications, only the control device 100 having passed a predetermined authentication process may receive the identification information. When the control device 100 requests identification information for the NFC tag embedded in the controller 240 through an NFC tagging operation, the NFC tag may determine whether to transmit the identification information to the control device 100 after the predetermined authentication process for the control device 100.

Figure 4:
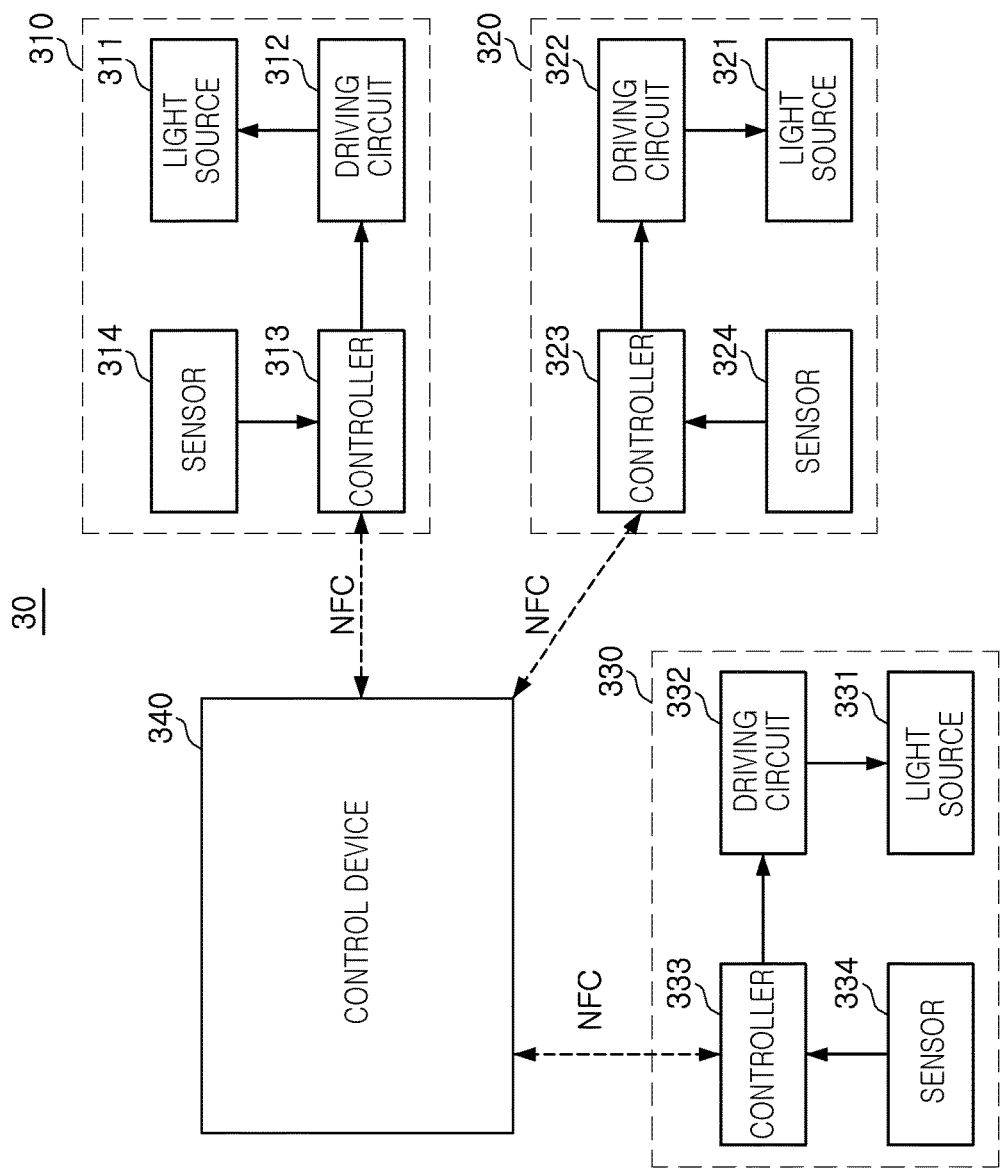
FIGS. 4 and 5 are schematic block diagrams of a lighting system according to an example embodiment.
Figure 5:
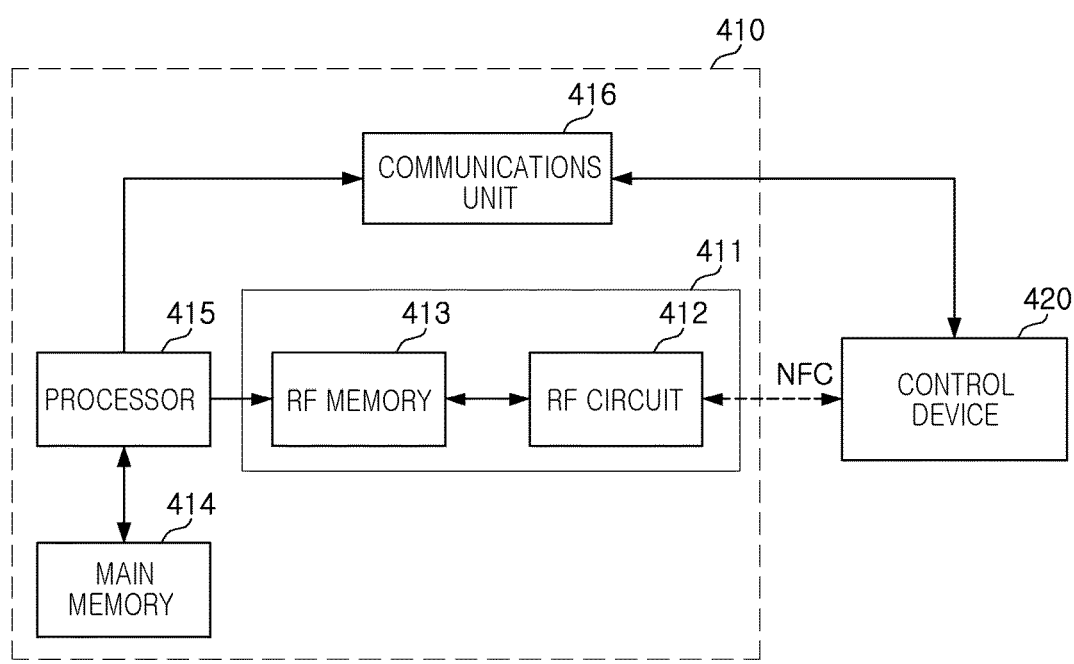

FIGS. 4 and 5 are schematic block diagrams of a lighting system according to an example embodiment.

With reference to FIG. 4, a lighting system 30 according to an example embodiment may include a plurality of lighting devices 310, 320, and 330, and at least one control device 340. One of ordinary skill in the art, whoever, will understand that more lighting devices and control devices may be included in the lighting system 30 than what is shown in FIG. 4. The plurality of lighting devices 310, 320, and 330 may include light sources 311, 321, and 331, driving circuits 312, 322, and 332, controllers 313, 323, and 333, and sensors 314, 324, and 334, respectively. The control device 340 may be connected to the controllers 313, 323, and 333 to communicate therewith through various wired/wireless communications, to transmit various control commands and setting commands, and the like to the lighting devices 310, 320, and 330.

Specifically, the control device 340 may read identification information of the respective lighting devices 310, 320, and 330 from the controllers 313, 323, and 333 thereof through the NFC communications. The lighting devices 310, 320, and 330 may respectively have unique identification information thereof, and the control device 340 may read the identification information from the controllers 313, 323, and 333 through the NFC communications. Because the identification information is read by the NFC communications, the identification information for the respective lighting devices 310, 320, and 330 may be collected even before the lighting devices 310, 320, and 330 are installed and receive power.

In general, in a case in which the lighting system is implemented in a specific space, identification information may be collected from the respective lighting devices 310, 320, and 330 in a state in which the lighting devices 310, 320, and 330 have been installed and power has been supplied thereto. In this case, the identification information for the respective lighting devices 310, 320, and 330 may not be collected until power is supplied to the lighting devices 310, 320, and 330. Thus, after the lighting devices 310, 320, and 330 are completely installed, settings data including settings parameters required for operations of the respective lighting devices 310, 320, and 330 may be generated. Thus, in a case in which a change in an installation plan of the lighting devices 310, 320, and 330 is required during a process of generating the settings data, because the lighting devices 310, 320, and 330 already installed may require rearrangement, the installation may take longer.

According to an example embodiment, the control device 340 may collect identification information for the respective lighting devices 310, 320, and 330 through the NFC communications, even before the lighting devices 310, 320, and 330 are installed. Thus, settings data for controlling the lighting system 30 may be generated before the lighting devices 310, 320, and 330 are installed, and the disposition of the lighting devices 310, 320, and 330 may be freely changed according to the settings data. Thus, the time required for installation of the lighting system 30 may be reduced.

The settings data generated by the control device 340 may include grouping information for dividing the plurality of lighting devices 310, 320, and 330 into a plurality of groups, lighting scheme information implemented by the lighting devices 310, 320, and 330, lighting zone control information for controlling lighting devices disposed in different spaces, and the like. Thus, a plan for installation of the lighting devices 310, 320, and 330 may be altered from the original plan used in the process of generating the settings data and simulating the lighting system 30. In an exemplary embodiment, because the settings data is generated before the installation of the lighting devices 310, 320, and 330 and is stored in the lighting devices 310, 320, and 330, even in a case in which the plan for installation of the lighting devices 310, 320, and 330 is changed, the inconvenience of rearranging lighting devices 310, 320, and 330 already installed may be prevented.

Next, NFC between a controller 410 of a lighting device and a control device 420 will be described referring to a lighting system 40 illustrated in FIG. 5. With reference to FIG. 5, the controller 410 of the lighting device may include an NFC tag 411, a main memory 414, a processor 415, and a communications unit 416. The NFC tag 411 may include an RF circuit 412 providing and receiving data to and from an NFC communications module provided in the control device 420 by an induced electromagnetic field. The NFC tag 411 may also include an RF memory 413. The RF memory 413 may store information for the lighting device.

When the control device 420 and the controller 410 come into close proximity to each other in a state in which the NFC function of the control device 420 has been activated, the control device 420 may read the identification information of the lighting device stored in the RF memory 413 therefrom via NFC communications. In this case, the NFC tag 411 may authenticate the control device 420 through a predetermined authentication process, and may then transmit the identification information of the lighting device to the control device 420.

The control device 420 may generate settings data required to control the lighting device, based on the identification information, and the settings data may be transmitted to the NFC tag 411 through the NFC communications and be stored in the RF memory 413. According to an example embodiment, after power is supplied to the controller 410, the settings data may be stored in the main memory 414, and subsequently, the processor 415 may encode the received settings data and store the encoded settings data in the main memory 414. When the lighting device starts to operate, the processor 415 may perform such operations as grouping of the lighting device with other lighting devices based on the settings data stored in the main memory 414, implementing a specific lighting scheme in the lighting device, and the like.

Figure 6:
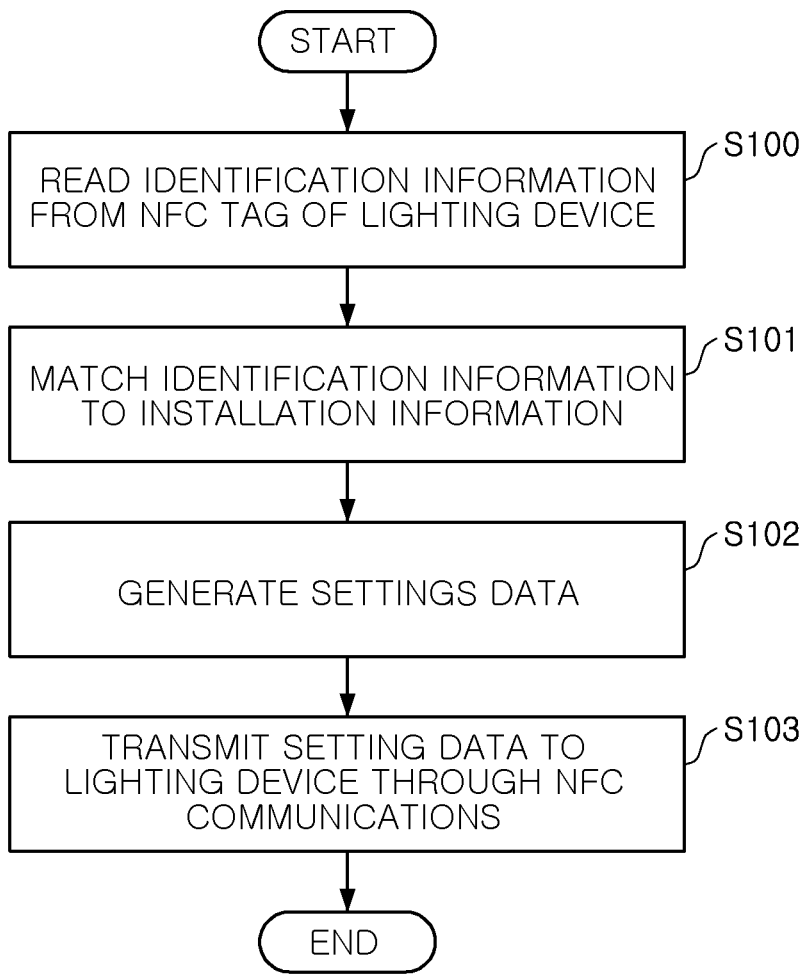
FIG. 6 is a flowchart illustrating a method of controlling a lighting device according to an example embodiment.

FIG. 6 is a flowchart illustrating a method of controlling a lighting device according to an example embodiment. Hereinafter, a method of controlling a lighting device according to an example embodiment will be described with reference to the control device 100 and the lighting device 200 illustrated in FIG. 3.

First, with reference to FIG. 6, the method of controlling a lighting device according to an example embodiment may be performed by starting to read identification information from an NFC tag of the lighting device 200 in S100. The NFC tag may include an RF circuit and an RF memory, and the identification information may be encoded and stored in the RF memory. The NFC tag may be included in the controller 240 of the lighting device 200.

When the identification information is read, the control device 100 may match the identification information to installation information in S101. The installation information may be information downloaded from an external server or the like to be stored before the control device 100 collects identification information, and may include layout map (e.g., drawings, schematics, etc.) containing information regarding respective positions at which a plurality of lighting devices 200 are to be installed, and the like. For example, assuming that the space in which the plurality of lighting devices 200 are to be installed is divided into 10 subspaces or areas and each of the lighting devices 200 is installed in one of the subspaces, the control device 100 may use the layout map, detailing the placement of the 10 subspaces in which the lighting device 200 is to be installed, and the like, as installation information.

The control device 100 may display the layout map on a display screen. A user may select one of the exemplary 10 subspaces represented in the layout map while the NFC communications function of the control device 100 is activated, and may then bring the control device 100 in proximity to a specific lighting device 200. The control device 100 may collect identification information from the lighting device hitherto brought into proximity with the control device 100, and the collected identification information may then be mapped or assigned to the subspace selected by the user. By repeating these operations, the user may map the identification information for the respective lighting devices 200 to one of the subspaces as part of the installation information before the lighting devices 200 are installed.

When the identification information of the lighting device 200 is mapped or matched to the installation information, the control device 100 may generate settings data in S102. The settings data may include grouping information for dividing the lighting devices into a plurality of groups, lighting scheme control information, lighting zone control information, and the like. A user may generate settings data using a predetermined application program provided by the control device 100.

The settings data generated in S102 may include information for controlling driving power output by the driving circuit 220 of the lighting device. Specifically, the controller 230 may control the output from the driving circuit 220 based on the settings data, from which brightness, color, a fade time, and the like of a light source 210 may be determined. The settings data may be transmitted from the control device 100 to the lighting device 200 through the NFC communications in S103. In particular, the settings data may be transferred from the control device 100 to the lighting device 200 through the NFC communications before the lighting device 200 is installed for operation.

Figure 7A:
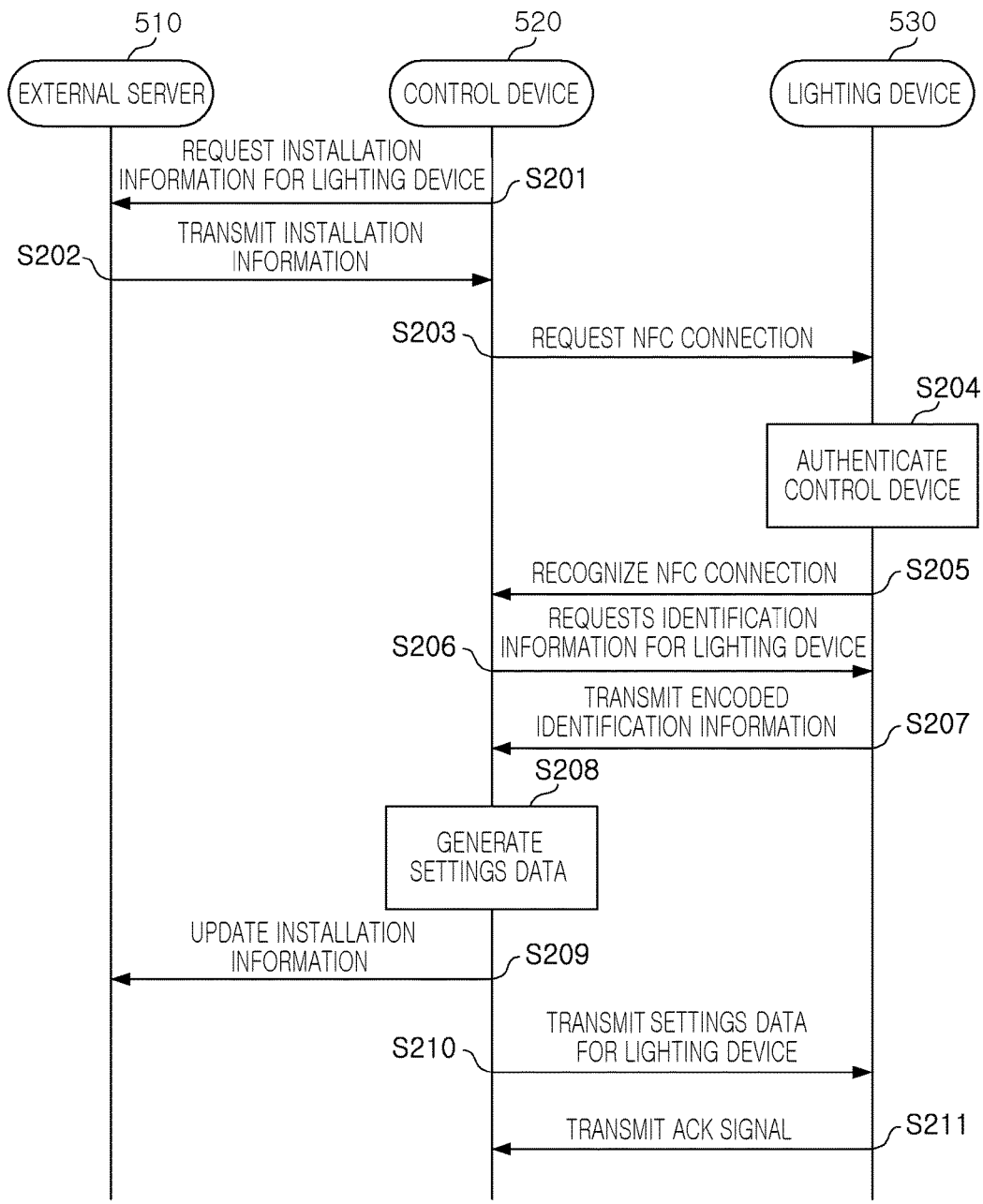
FIG. 7A is a sequence diagram of an operation of a lighting system according to an example embodiment.

FIG. 7A is a sequence diagram of an operation of a lighting system according to an example embodiment. With reference to FIG. 7A, an operation of a lighting system according to an example embodiment may be performed by interactions among an external server 510, a control device 520, and a lighting device 530.

First, the control device 520 may request installation information for the lighting device 530 from the external server 510 in S201. The external server 510 may be a server managed by a company to provide a lighting system, or the like, and the installation information requested in S201 may include a layout map or schematic illustrating a physical layout of a lighting device in a space in which a lighting system is to be installed, and the like. The external server 510 may transmit installation information for the lighting device to the control device 520 in response to the request, in S202.

The control device 520 may request an NFC connection from a controller of the lighting device 530 in S203. After the NFC communications module included in the control device 520 is activated, when the control device 520 and the controller of the lighting device 530 come into proximity to each other (e.g., within a threshold distance from each other), an NFC tag included in the controller of the lighting device 530 may be activated to receive the NFC connection request by the control device 520. The NFC tag may determine whether the control device 520 is authenticated using a predetermined encryption key, an authentication key, and the like stored in advance, in S204, and may recognize a successful authentication and establishment of the NFC connection with the control device 520 in S205.

When the NFC connection is recognized, the control device 520 may read identification information for the lighting device from the NFC tag embedded in the lighting device 530. When the control device 520 requests the identification information for the lighting device in S206, the NFC tag may transfer the identification information encoded and stored in the RF memory to the control device 520 in S207. Thus, compared to a case in which a bar code attached to the lighting device is read therefrom, or the identification information is read therefrom through Bluetooth™ communications with the lighting device, or the like, the identification information may be read therefrom in an encoded manner, thereby improving the security of the lighting system.

The control device 520 having received the identification information may match the identification information to installation information, to thus generate settings data, in S208. The settings data may include grouping information for respective lighting devices, lighting scheme control information thereof, and the like. The generated settings data may be transmitted to the external server 510, and the external server 510 may update the installation information, based on the settings data in S209.

A plan for installation of the lighting device may be included in the installation information transmitted to the control device 520 by the external server 510, and the identification information for respective lighting devices included in the lighting system may or may not be included therein. The control device 520 may map the identification information collected from the respective lighting device through the NFC communications to the lighting device corresponding to the installation information, to thus generate settings data, and may transmit the result thereof to the external server 510.

In addition, the control device 520 may transmit the settings data generated through the NFC communications in S208 to the lighting device 530 in S210. The lighting device 530 may receive the settings data and send an acknowledgement (ACK) signal to the control device 520 in S211. The settings data may be used to control operations of the lighting device.

Figure 7B:
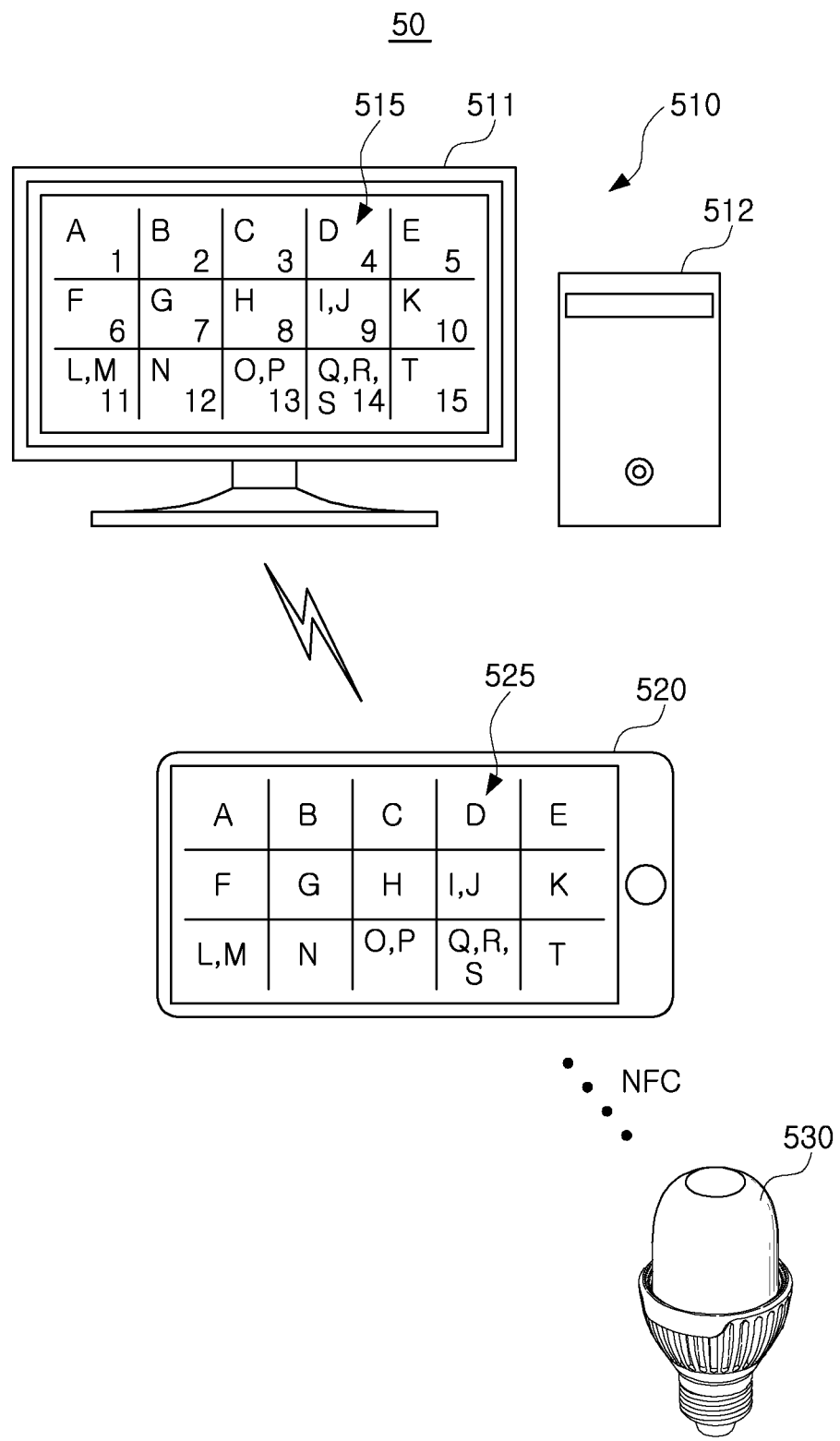
FIG. 7B is a drawing illustrating an operation of a lighting system according to an example embodiment.

FIG. 7B is a drawing illustrating an operation of a lighting system similar to the operation shown in FIG. 7A. With reference to FIG. 7B, a lighting system 50 according to an example embodiment may include an external server 510 storing installation information 515 therein and managing the stored information. The lighting system 50 may also include a control device 520 connected to the external server 510 to communicate therewith, and a lighting device 530. The lighting device 530 may be a plurality of lighting devices. Even before the lighting device 530 is installed and receives power, the control device 520 may collect data from the lighting device 530 through NFC communications or transmit data to the lighting device 530.

The external server 510 may store the installation information 515 therein and manage the stored information. The external server 510 may be configured to include a display device 511 and a server chassis 512. The installation information 515 may include information regarding the map or schematics of the abstract or physical spaces in which a plurality of lighting devices are to be installed. In the example embodiment shown in FIG. 7B, a total of 19 lighting devices 530 (represented by letters A through T) may be installed and spread across a total of 15 subspaces (i.e., areas or zones). Moreover, two or more lighting devices 530, corresponding to letters A through T in the installation information 515, may be installed in a single subspace (e.g., subspaces 9, 11, 13, and 14).

A user may download the installation information 515 into the control device 520 connected to the external server 510. The control device 520 may display the downloaded installation information 525. The installation information 525 displayed by the control device 520 may be a further simplified representation of the layout of the lighting devices 530 as compared to the installation information 515 stored in the external server 510. A user may select one of a plurality of positions A through T or subspaces 1 through 15 in which the lighting devices 530 are to be installed, from the installation information 525 displayed by the control device 520.

For example, it may be assumed that a user selects an installation position corresponding to letter B among the installation positions A through T. Alternatively, the user may select one of the subspaces 1 through 15. When the control device 520 approaches the lighting device 530 (e.g., comes within a threshold distance from the lighting device 530), the control device 520 may collect identification information from the lighting device 530 through the NFC communications and then map the collected identification information to the installation position corresponding to letter B. By repeating this process, the user may map the identification information for the respective lighting device 530 to installation information (i.e., installation positions or subspaces) even before the lighting device 530 is installed.

On the other hand, the settings data to be transmitted to the lighting devices 530 that will be installed in the respective installation positions A through T may be included in the installation information received by the control device 520 from the external server 510. For example, the settings data may include grouping information for grouping the installation positions A through T into a plurality of groups, communications channel settings information, lighting zone settings information, and the like. When the lighting device 530 is mapped to the installation position B, the control device 520 may transmit settings data corresponding to the installation position B to the lighting device 530 by the NFC communications. Thus, before the lighting device 530 is installed, operations such as collecting identification information for the respective lighting device 530 and transmitting settings data may be performed in advance.

Figure 8A:
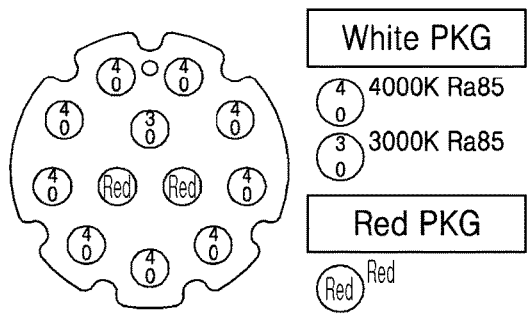
FIGS. 8A and 8B are schematic illustrations of white light source modules that may be applied to a lighting device according to an example embodiment.
Figure 8B:
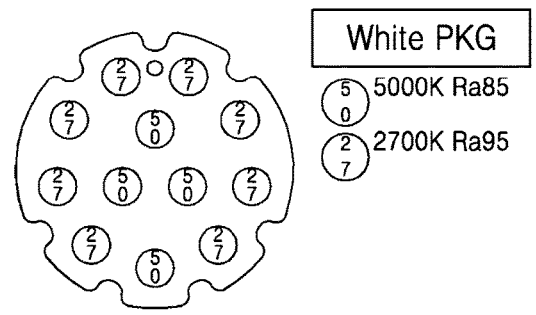

FIGS. 8A and 8B are schematic illustrations of white light source modules that may be applied to a lighting device according to an example embodiment. The white light source modules illustrated in FIGS. 8A and 8B may respectively include a plurality of light emitting device packages mounted on a circuit board. The plurality of light emitting device packages mounted on a single white light source module may be configured to be of the same type of light emitting device packages generating light having the same wavelength, or may also be configured to be of heterogeneous light emitting device packages generating light having different wavelengths.

With reference to FIG. 8A, a white light source module may be configured by combining white light emitting device packages "40" and "30" having color temperatures of 4000K and 3000K, respectively, and red light emitting device packages "Red." The white light source module may provide white light having a color temperature adjustable within a range of 3100K to 4000K and having a color rendering index Ra within a range of 95 to 100.

In another example embodiment, a white light source module may be configured to only consist of white light emitting device packages. In this case, a portion of the white light emitting device packages may have white light having a different color temperature. For example, as illustrated in FIG. 8B, the white light, of which a color temperature may be adjusted to be within a range of 2200K to 5000K and of which a color rendering index Ra is within a range of 85 to 99, may be provided by combining a white light emitting device package "27" having a color temperature of 2200K and a white light emitting device package "50" having a color temperature of 5000K. Here, the number of light emitting device packages having respective color temperatures may be changed depending on a preset value of a baseline color temperature. For example, when a lighting device has around 4000K of a preset baseline value of color temperature, the number of packages thereof corresponding to 4000K may be more than the number of packages corresponding to 3000K of color temperature or the number of red light emitting device packages.

As such, the heterogeneous light emitting device packages may be configured to include a light emitting device provided by combining a yellow, green, red, or orange phosphor with a blue light emitting device to emit white light and at least one of violet, blue, green, red, or infrared light emitting devices, to thus adjust a color temperature and a color rendering index (CRI) of white light. Such a white light source module as described above may be used as a light source in various types of lighting devices.

In a single light emitting device package, light having a required color may be determined depending on a wavelength of light from a light emitting diode (LED) chip, a light emitting device, and a phosphor type and a combination ratio of phosphors. In this case, when the light is white light, a color temperature and a color rendering index thereof may be controlled.

For example, when the LED chip emits blue light, a light emitting device package including at least one of yellow, green, and red phosphors may emit white light having various color temperatures according to a phosphor combination ratio. In another example, a light emitting device package, in which a green or red phosphor is applied to a blue LED chip, may emit green or red light. As such, by combining the light emitting device package emitting white light and the light emitting device package emitting green or red light, a color temperature and a color rendering index of white light may be controlled. In addition, a light emitting device package may also be configured to include at least one of light emitting devices emitting violet light, blue light, green light, red light, and infrared light.

In this case, in the lighting device, CRI may be adjusted from a level of a sodium-vapor lamp to a level of sunlight, and various types of white light having a color temperature of around 1500K to around 20000K may be generated. In addition, a lighting color may be adjusted to be appropriate for an ambient atmosphere or for the viewer's mood by generating violet, blue, green, red, or orange visible light or infrared light as needed. Further, the lighting device may also emit light within a special wavelength band, for example, capable of promoting plant growth.

Figure 9:
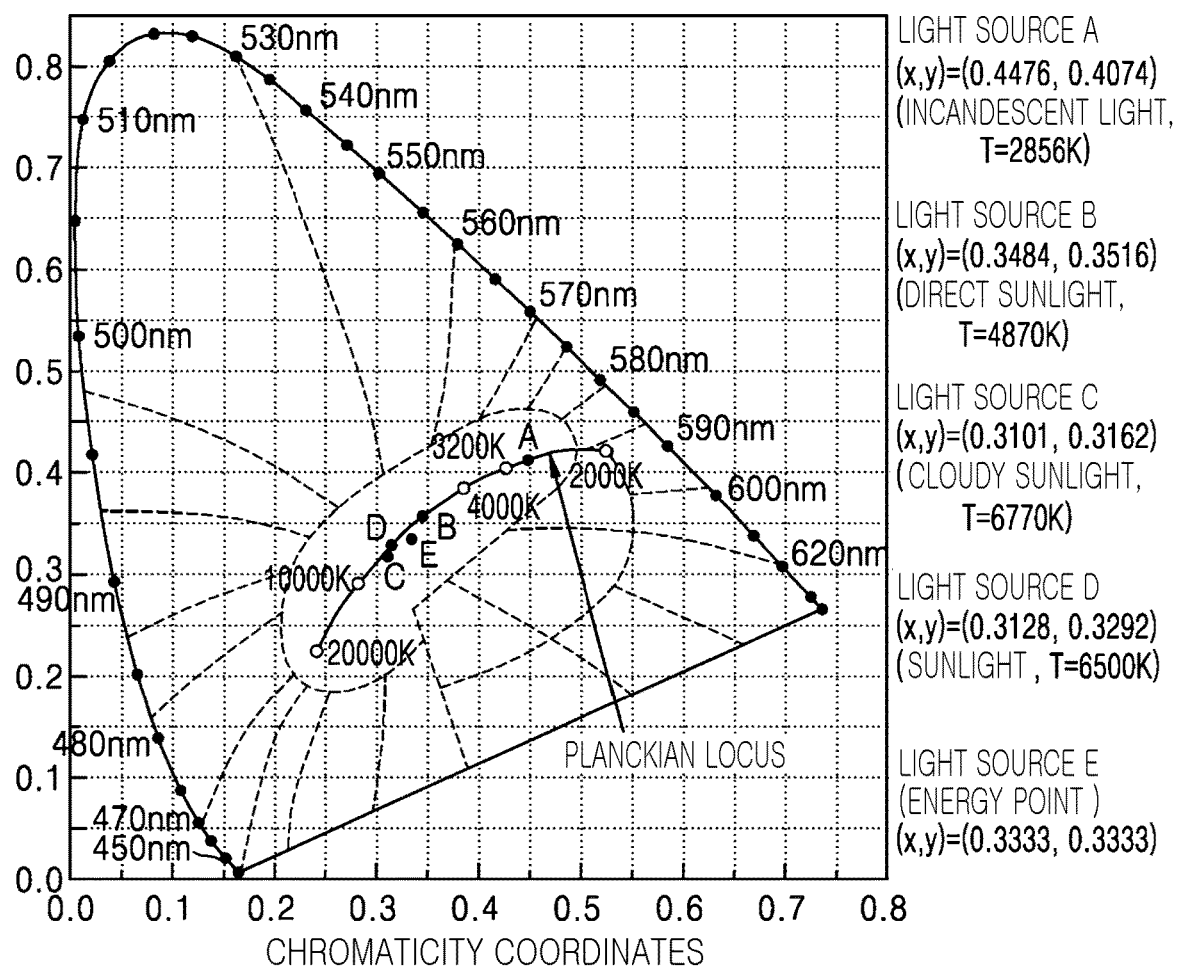
FIG. 9 is a Comission Internationale de l'Eclairage (CIE) 1931 color space chromaticity diagram illustrating operations of white light source modules according to an example embodiment.

FIG. 9 is a CIE 1931 color space chromaticity diagram illustrating operations of the white light source modules illustrated in FIGS. 8A and 8B. White light obtained by combining yellow, green, red phosphors and/or green and red light emitting devices with a blue light emitting device may have two or more peak wavelengths. The coordinates (x, y) of the peak wavelengths in the CIE 1931 color space chromaticity diagram, as illustrated in FIG. 9, may be located on line segments (0.4476, 0.4074), (0.3484, 0.3516), (0.3101, 0.3162), (0.3128, 0.3292), and (0.3333, 0.3333) connected to one another. Alternatively, the coordinates (x, y) may be located in a region surrounded by the line segments and a blackbody radiation spectrum. A color temperature of white light may be within a range of 1500K to 20000K. In FIG. 9, white light in the vicinity of point E (0.3333, 0.3333) below the blackbody radiation spectrum may be in a state in which light of a yellow-based component becomes relatively weak. This white light may be used as an illumination light source of a region in which a relatively bright or refreshing mood may be induced in a person when absorbed through a naked eye. Thus, a lighting device product using white light in the vicinity of point E (0.3333, 0.3333) below the blackbody radiation spectrum may be effective for use in retail spaces in which groceries, clothing, or the like are displayed and sold.

Figure 10:
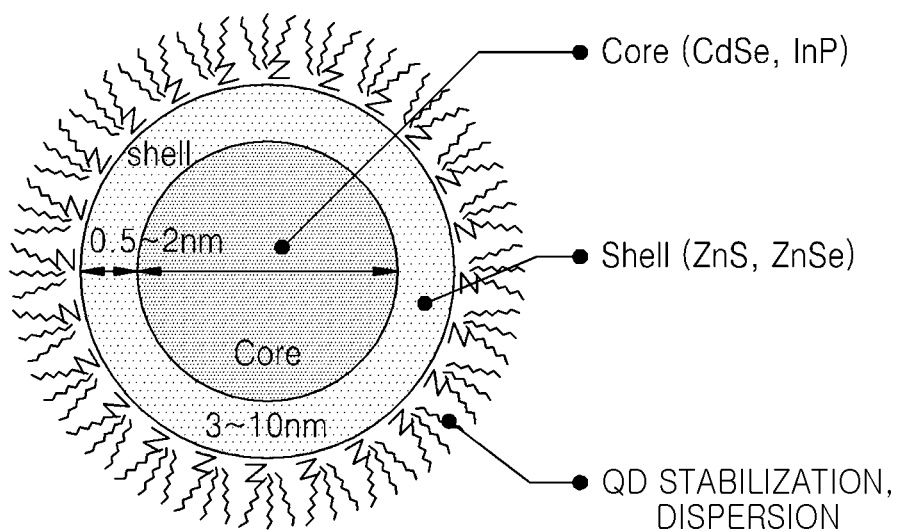
FIG. 10 is a drawing illustrating a wavelength conversion material that may be applied to a light source of a lighting device according to an example embodiment.

FIG. 10 is a drawing illustrating a wavelength conversion material that may be applied to a light source of a lighting device according to an example embodiment.

The wavelength conversion material may be a material for converting a wavelength of light emitted from a light emitting device. The wavelength conversion material may be a phosphor and/or a quantum dot.

In an example embodiment, phosphors applied to the wavelength conversion material may be represented by the following empirical formula and corresponding colors, as shown below.

Oxide-based Phosphor: Yellow and green $Y_3Al_5O_{12}$:Ce, $Tb_3Al_5O_{12}$: Ce, $Lu_3Al_5O_{12}$: Ce Silicate-based Phosphor: Yellow and green $(Ba,Sr)_2SiO_4$: Eu, yellow and yellowish-orange $(Ba,Sr)_3SiO_5$:Ce Nitride-based Phosphor: Green β-SiAlON:Eu, yellow $La_3Si_8N_{11}$:Ce, yellowish-orange α-SiAlON:Eu, red $CaAlSiN_3$:Eu, $Sr_2Si_5N_8$:Eu, $SrSiAl_4N_2$:Eu, $SrLiAl_3N_4$:Eu, $Ln_{4-x}(Eu_zM_{1-z})_xSi_{12-y}Al_yO_{3+x+y}N_{18-x-y}$ (0.5≤x≤3, 0<z<0.3, 0<y≤4) (Formula 1) (In Formula 1, Ln may be at least one element selected from a group consisting of group IIIa elements and rare-earth elements, and M may be at least one element selected from a group consisting of calcium (Ca), barium (Ba), strontium (Sr), and magnesium (Mg).)

Fluoride-based Phosphor: KSF-based red $K_2SiF_6$:$Mn_4^+$, $K_2TiF_6$:$Mn_4^+$, $NaYF_4$:$Mn_4^+$, $NaGdF_4$:$Mn_4^+$ (e.g., a composition ratio of Mn may be provided by 0<z≤0.17)

A phosphor composition should conform to stoichiometry, and respective elements may be substituted with other elements in a group of the periodic table of elements in which an element corresponding thereto is included. For example, Sr may be substituted with Ba, Ca, Mg, or the like, of an alkaline earth group II, and Yttrium (Y) may be substituted with lanthanum-based terbium (Tb), lutetium (Lu), scandium (Sc), gadolinium (Gd), or the like. In addition, Europium (Eu) or the like, an activator, may be substituted with cerium (Ce), Tb, praseodymium (Pr), erbium (Er), ytterbium (Yb), or the like, according to a required energy level. In addition, an activator may be used alone, or a sub-activator or the like, for modification of characteristics thereof, may additionally be used.

In particular, in the case of a fluoride-based red phosphor, in order to improve reliability thereof at a relatively high temperature/high humidity, a phosphor may be coated with a fluoride not containing manganese (Mn), or a phosphor surface or a fluoride-coated surface of phosphor coated with a fluoride not containing Mn may further be coated with an organic material. In the case of the fluoride-based red phosphor as described above, a full width at half maximum (FWHM) of 40 nm or less may be obtained in a manner different from the case of other phosphors, and thus, the fluoride-based red phosphor may be used in high-resolution TV sets such as ultra high-definition (UHD) TVs.

The following Table 1 illustrates phosphor types in light emitting device packages using a blue LED chip having a dominant wavelength in a range of 440 nm to 460 nm, or a ultraviolet (UV) LED chip having a dominant wavelength in a range of 380 nm to 440 nm, which may be applied to respective application fields.

TABLE 1

| Use | Phosphor |
|---|---|
| LED TV | $\beta$-SiAlON:$Eu^{2+}$, (Ca, Sr)$AlSiN_3$:$Eu^{2+}$, $La_3Si_6N_{11}$:$Ce^{3+}$, $K_2SiF_6$:$Mn^{4+}$, $SrLiAl_3N_4$:Eu, $Ln_{4-x}(Eu_zM_{1-z})_xSi_{12-y}Al_yO_{3+x+y}N_{18-x-y}$ (0.5 ≤ x ≤ 3, 0 < z < 0.3, 0 < y ≤ 4), $K_2TiF_6$:$Mn^{4+}$, $NaYF_4$:$Mn^{4+}$, $NaGdF_4$:$Mn^{4+}$, $K_3SiF_7$:$Mn^{4+}$ |
| Lighting | $Lu_3Al_5O_{12}$:$Ce^{3+}$, Ca-$\alpha$-SiAlON:$Eu^{2+}$, $La_3Si_6N_{11}$:$Ce^{3+}$, (Ca, Sr)$AlSiN_3$:$Eu^{2+}$, $Y_3Al_5O_{12}$:$Ce^{3+}$, $K_2SiF_6$:$Mn^{4+}$, $SrLiAl_3N_4$:Eu, $Ln_{4-x}(Eu_zM_{1-z})_xSi_{12-y}Al_yO_{3+x+y}N_{18-x-y}$ (0.5 ≤ x ≤ 3, 0 < z < 0.3, 0 < y ≤ 4), $K_2TiF_6$:$Mn^{4+}$, $NaYF_4$:$Mn^{4+}$, $NaGdF_4$:$Mn^{4+}$, $K_3SiF_7$:$Mn^{4+}$ |
| Side View (Mobile Device, Notebook PC) | $Lu_3Al_5O_{12}$:$Ce^{3+}$, Ca-$\alpha$-SiAlON:$Eu^{2+}$, $La_3Si_6N_{11}$:$Ce^{3+}$, (Ca, Sr)$AlSiN_3$:$Eu^{2+}$, $Y_3Al_5O_{12}$:$Ce^{3+}$, (Sr, Ba, Ca, Mg)$_2SiO_4$:$Eu^{2+}$, $K_2SiF_6$:$Mn^{4+}$, $SrLiAl_3N_4$:Eu, $Ln_{4-x}(Eu_zM_{1-z})_xSi_{12-y}Al_yO_{3+x+y}N_{18-x-y}$ (0.5 ≤ x ≤ 3, 0 < z < 0.3, 0 < y ≤ 4), $K_2TiF_6$:$Mn^{4+}$, $NaYF_4$:$Mn^{4+}$, $NaGdF_4$:$Mn^{4+}$, $K_3SiF_7$:$Mn^{4+}$ |
| Electronic device (Head Lamp, etc.) | $Lu_3Al_5O_{12}$:$Ce^{3+}$, Ca-$\alpha$-SiAlON:$Eu^{2+}$, $La_3Si_6N_{11}$:$Ce^{3+}$, (Ca, Sr)$AlSiN_3$:$Eu^{2+}$, $Y_3Al_5O_{12}$:$Ce^{3+}$, $K_2SiF_6$:$Mn^{4+}$, $SrLiAl_3N_4$:Eu, $Ln_{4-x}(Eu_zM_{1-z})_xSi_{12-y}Al_yO_{3+x+y}N_{18-x-y}$ (0.5 ≤ x ≤ 3, 0 < z < 0.3, 0 < y ≤ 4), $K_2TiF_6$:$Mn^{4+}$, $NaYF_4$:$Mn^{4+}$, $NaGdF_4$:$Mn^{4+}$, $K_3SiF_7$:$Mn^{4+}$ |

On the other hand, the wavelength conversion material may include a quantum dot (QD) provided as a phosphor substitute or mixed with a phosphor.

FIG. 10 illustrates a cross-sectional structure of a quantum dot. The quantum dot (QD) may have a core-shell structure using a III-V or II-VI compound semiconductor. For example, the quantum dot may have a core such as a structure of CdSe, InP, or the like, and a shell such as a structure of ZnS, ZnSe, or the like. Further, the QD may have a ligand for stabilization of the core and the shell. For example, the core may have a diameter in a range of 1 nm to 30 nm, and especially in the rage of 3 nm to 10 nm. The shell may have a thickness in a range of 0.1 nm to 20 nm, and especially in the rage of 0.5 nm to 2 nm.

The quantum dot may implement various colors depending on the size thereof. In particular, in a case in which the quantum dot is used as a phosphor substitute, the quantum dot may be used as a red or green phosphor. When the quantum dot is used, a narrow FWHM (e.g., 35 nm) may be achieved.

For example, the wavelength conversion material may be provided as contained in an encapsulation material or in a scheme in which the conversion material is first manufactured as a film and then attached to a surface of an optical device such as an LED chip or a light guide plate. In the case of using a wavelength conversion material that is first manufactured as a film, the wavelength conversion material having a uniform thickness may be obtained more easily.

Figure 11:
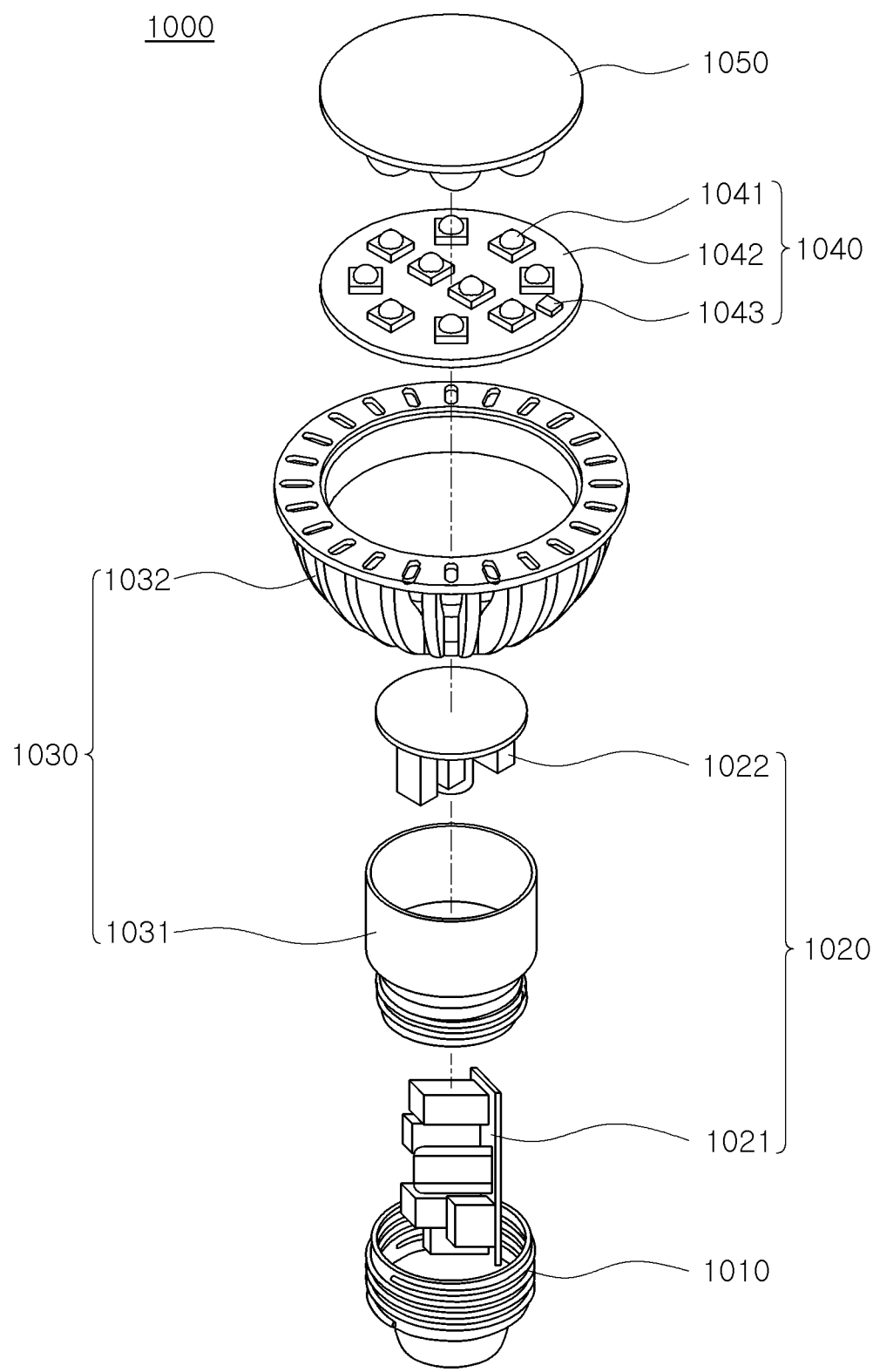
FIGS. 11 and 12 are exploded perspective views schematically illustrating a bulb type lamp that may be applied to a lighting system according to an example embodiment.

FIG. 11 is an exploded perspective view schematically illustrating a bulb type lamp as a lighting device according to an exemplary embodiment.

In particular, a lighting device 1000 may include a socket 1010, a power source unit 1020, a heat dissipation unit 1030, a light source module 1040, and an optical unit 1050. According to an exemplary embodiment, the light source module 1040 may include a light emitting device array, and the power source unit 1020 may include a light emitting device driving unit.

The socket 1010 may be configured to be compatible with conventional lighting device receptacles and thus to substitute a conventional lighting device. Power supplied to the lighting device 1000 may be applied through the socket 1010. As illustrated, the power source unit 1020 may include a first power source unit 1021 and a second power source unit 1022. The first power source unit 1021 and the second power source unit 1022 may be assembled to form the power source unit 1020. The heat dissipation unit 1030 may include an internal heat dissipation unit 1031 and an external heat dissipation unit 1032. The internal heat dissipation unit 1031 may be directly connected to the light source module 1040 and/or the power source unit 1020 to transmit heat to the external heat dissipation unit 1032. The optical unit 1050 may include an internal optical unit and an external optical unit, and may be one or more lenses configured to evenly distribute light emitted from the light source module 1040.

The light source module 1040 may emit light through the optical unit 1050 upon receiving power from the power source unit 1020. The light source module 1040 may include one or more light emitting devices 1041, a circuit board 1042, and a controller 1043. The controller 1043 may store driving information of the light emitting devices 1041.

Figure 12:
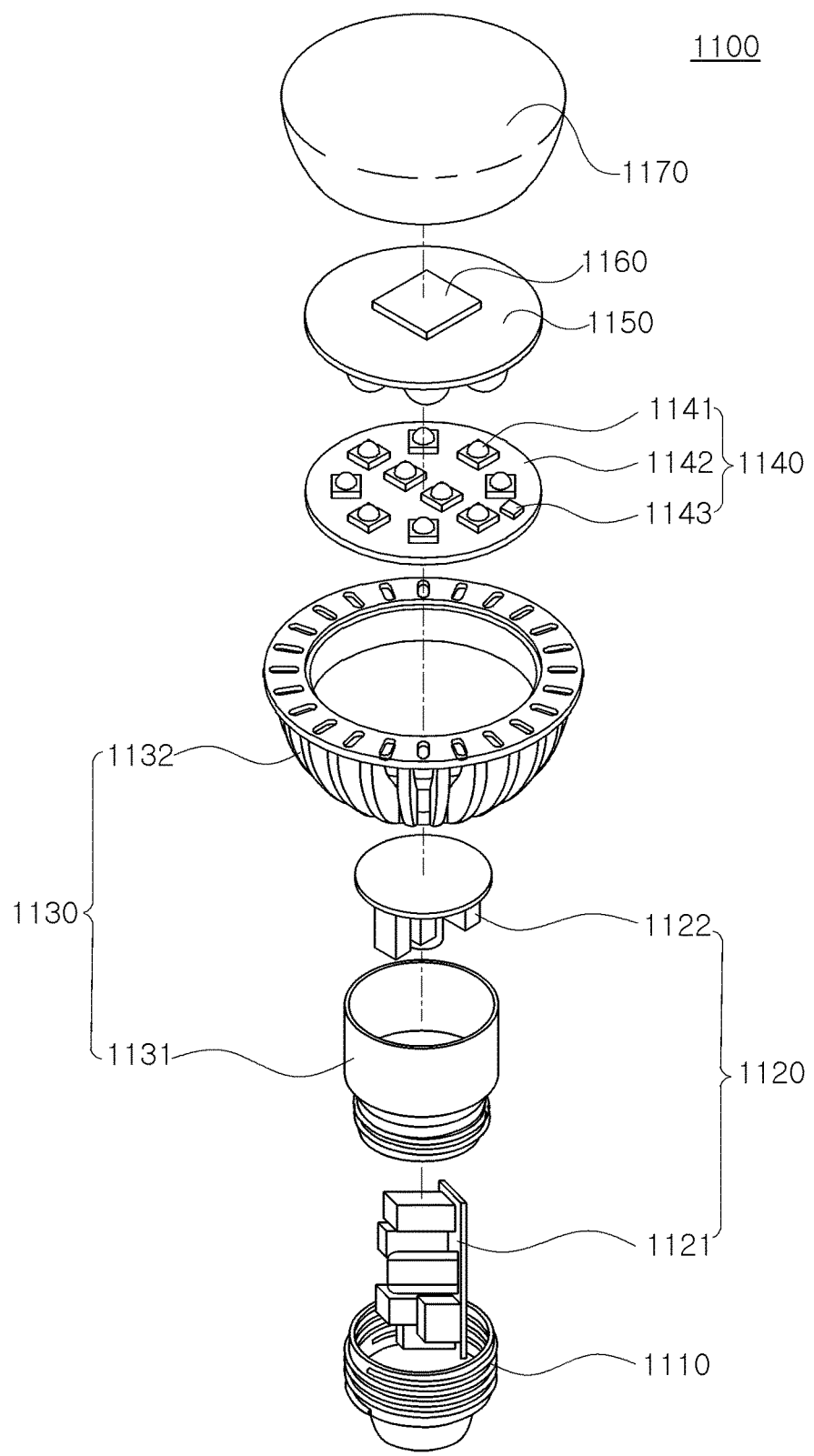

FIG. 12 is an exploded perspective view schematically illustrating a bulb type lamp, a lighting device that may be applied to a lighting system according to an example embodiment.

With reference to FIG. 12, a lighting device 1100 may include a light bulb base (i.e., socket) 1110, a driving circuit 1120, a heat sink (i.e., heat dissipation unit) 1130, a light source 1140, and an optical unit 1150. According to an exemplary embodiment, the light source 1140 may include a light emitting device array, and the driving circuit 1120 may include a rectifying circuit, a DC-DC converter or an alternating current (AC) direct-coupled driving circuit, and the like. A reflective plate 1150 may be provided above the light source 1140. The reflective plate 1150 may allow for uniform spreading of light from the light source 1140 sideways and backwards so as to reduce a glare effect of light.

The light bulb base 1110 may be configured such that the lighting device 1100 may substitute a conventional lighting apparatus. Power supplied to the lighting device 1100 may be applied through the light bulb base 1110 thereto. As illustrated in FIG. 12, the driving circuit 1120 may include a first circuit unit 1121 and a second circuit unit 1122 that are separated from or coupled to each other. The heat sink 1130 may include an internal heat sink portion 1131 and an external heat sink portion 1132. The internal heat sink portion 1131 may be directly connected to the light source 1140 and/or the driving circuit 1120, by which heat may be transferred to the external heat sink portion 1132. The optical unit 1170 may include an internal optical portion and an external optical portion, and may be configured in such a manner that light emitted from the light source 1140 may be uniformly dispersed.

The light source 1140 may receive power from the driving circuit 1120 and emit light towards the optical unit 1150. The light source 1140 may include one or more light emitting devices 1141, a circuit board 1142, and a controller 1143, and the controller 1143 may store driving information for the light emitting devices 1141 therein.

The controller 1143 may include an NFC tag for NFC communications, and may control operations of the driving circuit 1120. Identification information for the lighting device 1100 may be stored in the NFC tag of the controller 1143, and for example, when an NFC module of a control device in proximity to the lighting device 1100 is activated, the identification information for the lighting device 1100 may be transmitted to the control device.

The communications module 1160 may be mounted on an upper portion of the reflective plate 1150, and home network communications may be implemented through the communications module 1160. For example, the communications module 1160 may be a wireless communications module using Zigbee®, Wi-Fi, or Li-Fi, and may control illumination of a lighting device installed indoors or outdoors, such as switching on/off, adjustment of brightness, or the like, through a smartphone or other wireless controller. In addition, electronic products in the home or outdoors and automobile systems, such as TV sets, refrigerators, air conditioners, door locks, automobiles, or the like, may be controlled using a Li-Fi communications module that uses a visible light wavelength of a lighting device installed indoors or outdoors.

The reflective plate 1150 and the communications module 1160 may be covered by the optical unit 1170. The communications module 1160 may also be implemented as a single integrated circuit that includes the controller 1143. In addition, the controller 1143 may be provided as a separate module from the light source 1140.

Figure 13:
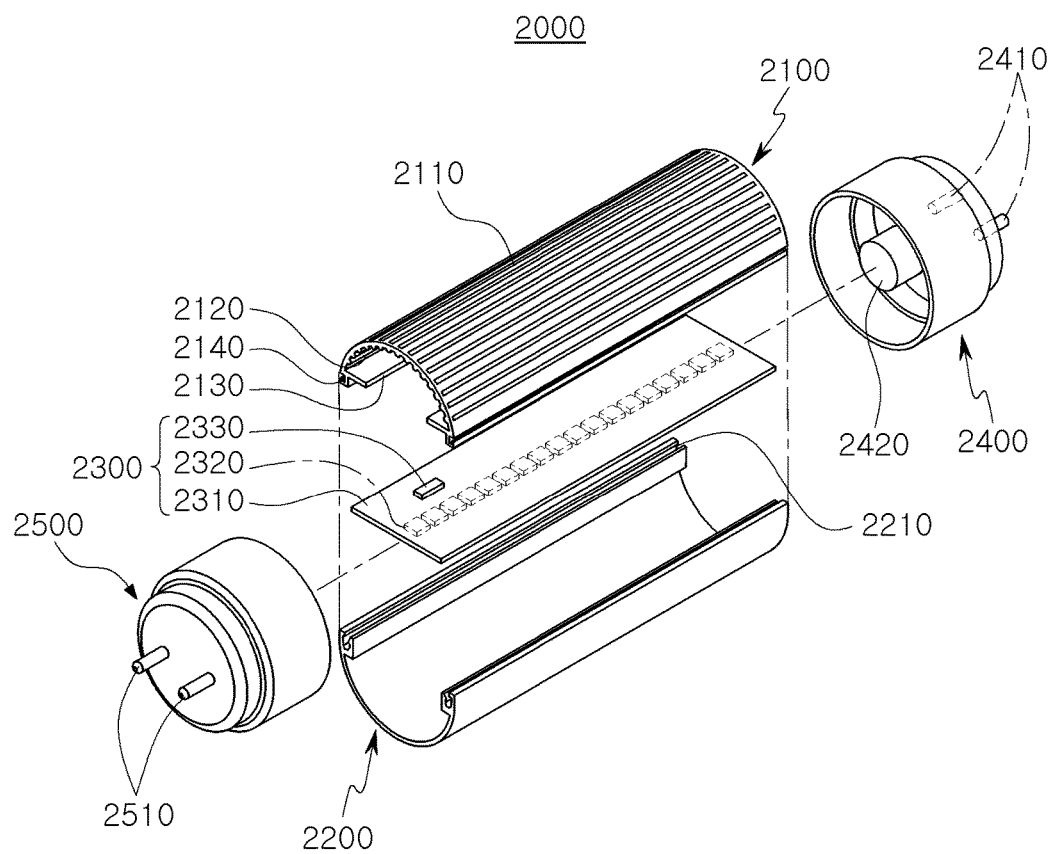
FIG. 13 is an exploded perspective view schematically illustrating a bar-type lamp, a lighting device to which a semiconductor light emitting device according to an example embodiment may be applied.

FIG. 13 is an exploded perspective view schematically illustrating a bar-type lamp, a lighting device to which a semiconductor light emitting device according to an example embodiment may be applied.

In particular, a lighting device 2000 may include a heat radiating member 2100, a cover 2200, a light source module 2300, a first socket 2400, and a second socket 2500. A plurality of heat radiating fins 2110 and 2120 having a concave-convex form (i.e., ridges and grooves) may be formed on an inner surface and/or an external surface of the heat radiating member 2100 (also referred to as a heat dissipating unit or a heat sink), and the heat radiating fins 2110 and 2120 may be designed to have various forms and intervals therebetween. A support portion 2130 having a protrusion form may be formed on an inner side of the heat sink member 2100. The light source module 2300 may be affixed to the support portion 2130. A stop protrusion 2140 may be formed on two ends of the heat sink member 2100.

A stop groove 2210 may be formed on the cover 2200. The stop groove 2210 may be coupled to the stop protrusion 2140 of the heat sink member 2100 in a hook coupling structure. Positions in which the stop groove 2210 and the stop protrusion 2140 are formed may also be inversely changed.

The light source module 2300 may include a light emitting device array. The light source module 2300 may include a printed circuit board 2310, one or more light sources 2320, and a controller 2330. As described above, the controller 2330 may store driving information for the light source 2320 therein. Circuit wires for operating the light source 2320 may be disposed in the printed circuit board 2310. In addition, the printed circuit board 2310 may also include constituent elements for operating the light source 2320. The controller 2330 may include an NFC tag storing therein identification information corresponding to the lighting device 2000.

The first and second sockets 2400 and 2500 may be provided as a pair of sockets, and may have a structure in which they are coupled to two ends of a cylindrical cover unit configured of the heat sink member 2100 and the cover 2200. For example, the first socket 2400 may include electrode terminals 2410 and a power supply device 2420, and the second socket 2500 may include dummy terminals 2510 disposed thereon. In addition, an optical sensor and/or a communications module may be disposed inside one of the first socket 2400 or the second socket 2500. For example, the optical sensor and/or the communications module may be installed within the second socket 2500 in which the dummy terminals 2510 are disposed. In another example, an optical sensor and/or a communications module may also be installed within the first socket 2400 in which the electrode terminals 2410 are disposed.

Figure 14:
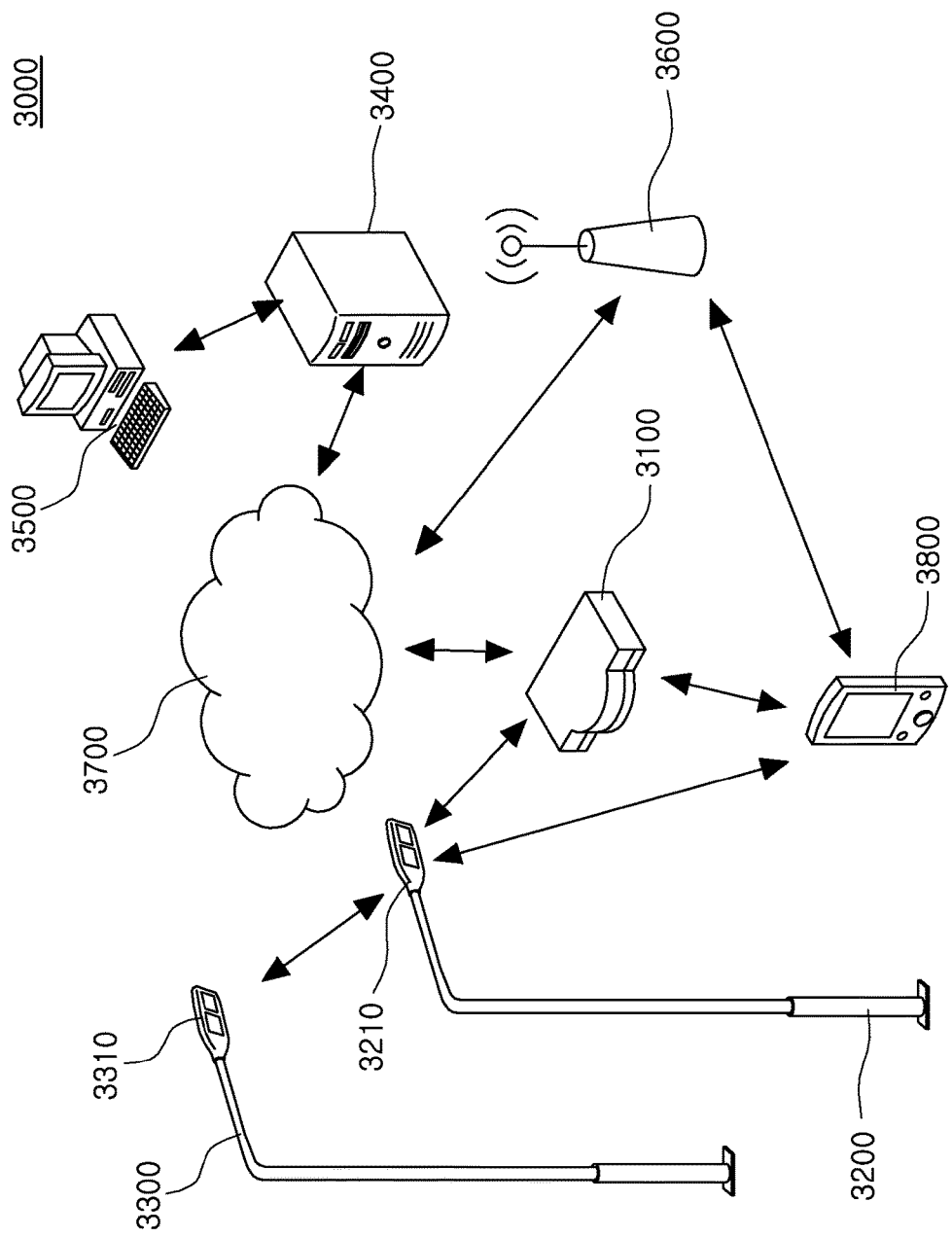
FIG. 14 is a schematic diagram illustrating a lighting system according to an example embodiment.

FIG. 14 is a schematic diagram illustrating a lighting system according to an example embodiment.

FIG. 14 is a schematic diagram illustrating a lighting system according to an example embodiment of a network system 3000 applied to an open space. With reference to FIG. 14, a network system 3000 may include a communications connection device 3100, a plurality of lighting fixtures 3200 and 3300 installed with a predetermined distance therebetween and connected to the communications connection device 3100 to communicate therewith, a server 3400, a computer 3500 to manage the server 3400, a communications base station 3600, a communications network 3700 connecting communications devices to each other, a mobile device 3800, and the like.

The plurality of lighting fixtures 3200 and 3300 installed in open external spaces such as roads or parks may include smart engines 3210 and 3310, respectively. The smart engines 3210 and 3310 may respectively include a light emitting device emitting light, a driver driving the light emitting device, a sensor collecting information regarding an ambient environment, a communications module, and the like. The smart engines 3210 and 3310 may communicate with other ambient devices according to a communications protocol such as Wi-Fi, Zigbee®, Li-Fi, or the like.

In an example embodiment, a single smart engine 3210 may be connected to another smart engine 3310 to facilitate communication therewith. In this example, a Wi-Fi mesh may be applied to communications between the smart engines 3210 and 3310. At least one smart engine 3210 may be connected to the communications connection device 3100 that is connected to the communications network 3700, via wired/wireless communication methods. In order to increase communication efficiency, a plurality of smart engines 3210 and 3310 may be provided as one group to thus be connected to a single communications connection device 3100.

The communications connection device 3100 may be an access point (AP) through which wired/wireless communications may be carried out, and may relay communications between the communications network 3700 and other devices. Alternatively, the communications network 3700 may be a switch, a router, a gateway, a relay, etc. The communications connection device 3100 may be connected to the communications network 3700 via at least one of wired and wireless schemes, and in an example embodiment, may be integrated inside one of the lighting fixtures 3200 and 3300.

The communications connection device 3100 may be connected to the mobile device 3800 via a communications protocol such as Wi-Fi or the like. A user of the mobile device 3800 may receive ambient environmental information collected by the plurality of smart engines 3210 and 3310 via the communications connection device 3100 connected to the smart engine 3210 of the lighting fixture 3200 when the mobile device 3800 comes in proximity to the lighting fixture 3200. The ambient environmental information may include surrounding traffic information, weather information, and the like. The mobile device 3800 may also be connected to the communications network 3700 in a wireless cellular communications scheme of 3G, 4G, or the like through the communications base station 3600.

In another example, the server 3400 connected to the communications network 3700 may receive information collected by the smart engines 3210 and 3310 installed in the lighting fixtures 3200 and 3300, respectively, and may simultaneously monitor an operating state of the respective lighting fixtures 3200 and 3300 and the like. In order to manage the respective lighting fixtures 3200 and 3300 based on the monitored operating state of the respective lighting fixtures 3200 and 3300, the server 3400 may be connected to the computer 3500 providing a management system. The computer 3500 may execute software and the like that may monitor and manage an operating state of the respective lighting fixtures 3200 and 3300, and in particular, the smart engines 3210 and 3310.

In order to transfer information collected by the smart engines 3210 and 3310 to the mobile device 3800 of a user, various communications schemes may be applied. With reference to FIG. 14, through the communications connection device 3100 connected to the smart engines 3210 and 3310, information collected by the smart engines 3210 and 3310 may be transmitted to the mobile device 3800, or the smart engines 3210 and 3310 and the mobile device 3800 may be connected to each other to directly communicate with each other. The smart engines 3210 and 3310 and the mobile device 3800 may directly communicate with each other by visible light wireless communications (Li-Fi).

Figure 15:
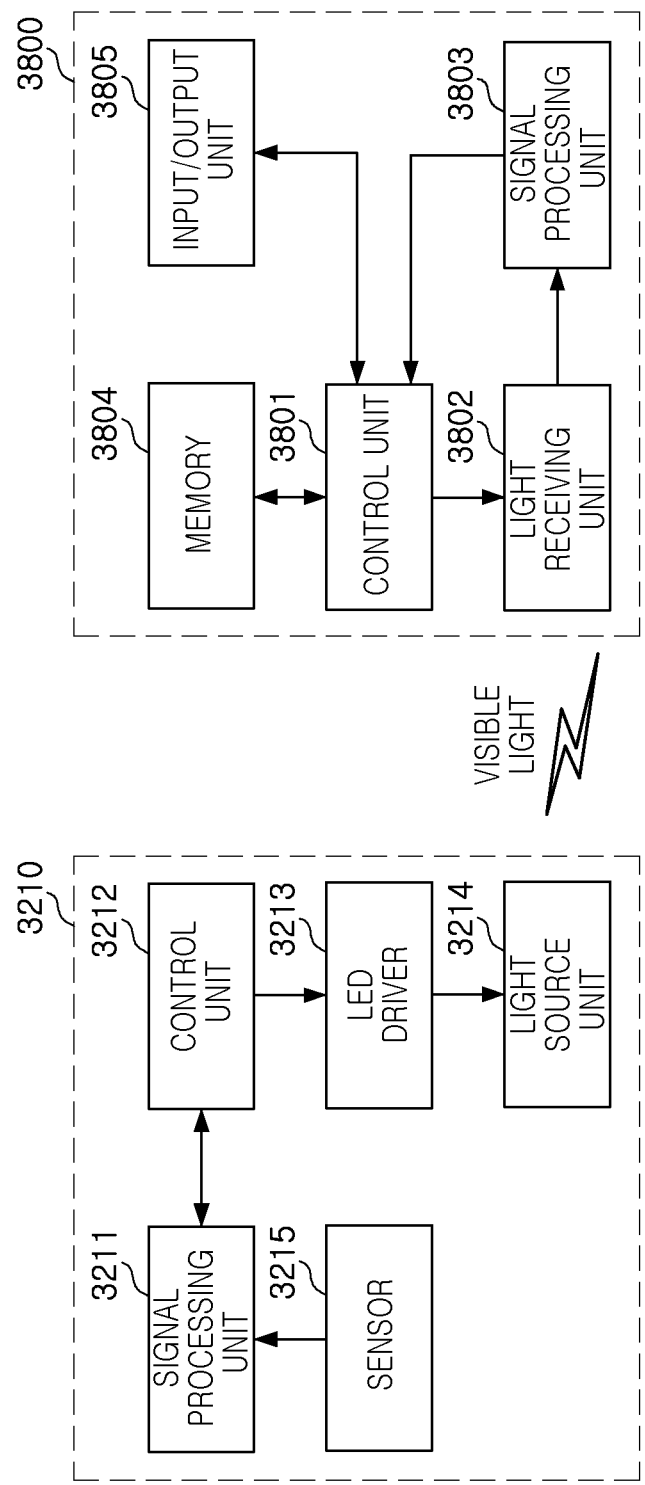
FIG. 15 is a block diagram illustrating a communications operation between a smart engine of a lighting fixture and a mobile device via visible light wireless communications according to an example embodiment.

FIG. 15 is a block diagram illustrating a communications operation between a smart engine 3210 of a lighting fixture 3200 and a mobile device 3800 via visible light wireless communications. With reference to FIG. 15, a smart engine 3210 may include a signal processing unit 3211, a control unit 3212, an LED driver 3213, a light source unit 3214, a sensor 3215, and the like. The mobile device 3800, connected to the smart engine 3210 via the visible light wireless communications, may include a control unit 3801, a light receiving unit 3802, a signal processing unit 3803, a memory 3804, an input/output unit 3805, and the like.

The visible light wireless communications (Li-Fi) technology may be a wireless communications technology of transferring information in a wireless manner using light in a visible light wavelength band, perceptible to the human eye. Such a visible light wireless communications technology may be distinguished from an existing wired optical communications technology and infrared wireless communications in that light within a visible light wavelength band, for example, a frequency of specific visible light from a light emitting package described in the example embodiment, is used, and may also be distinguished from a wired optical communications technology in that a communications environment is wireless. In addition, the visible light wireless communications technology may provide convenience in that it may be free of regulations or a need to obtain permission in terms of using a frequency band. Li-Fi also boasts increased convenience and security, and allows a user to visibly confirm the establishment of communications links, unlike radio frequency (RF) wireless communications. Furthermore, the visible light wireless communications technology facilitates convergence of disparate technologies by allowing a light source to simultaneously perform a communications function.

With reference to FIG. 15, the signal processing unit 3211 of the smart engine 3210 may process data to be transmitted and received by the visible light wireless communications. In an example embodiment, the signal processing unit 3211 may process information collected by the sensor 3215, and transmit the data to the control unit 3212. The control unit 3212 may control operations of the signal processing unit 3211, the LED driver 3213, and the like, and in particular, may control operations of the LED driver 3213 based on the data transmitted by the signal processing unit 3211. The LED driver 3213 may enable the light source unit 3214 to emit light in response to a control signal transferred by the control unit 3212, and may thus transfer data to the mobile device 3800.

The mobile device 3800 may include a control unit 3801; a memory 3804 storing data therein; an input/output unit 3805 including a display, a touchscreen, an audio output unit, and the like; a signal processing unit 3803; a light receiving unit 3802 for recognizing visible light including data; and the like. The light receiving unit 3802 may sense visible light and convert the sensed visible light into an electrical signal. The signal processing unit 3803 may decode data included in the electrical signal converted by the light receiving unit 3802. The control unit 3801 may store data decoded by the signal processing unit 3803 in the memory 3804 or output the data through the input/output unit 3805 or the like so as to be delivered to a user.

As set forth above, in a lighting system according to example embodiments, a plurality of lighting devices included therein may respectively store identification information allocated to the respective lighting devices in an NFC tag. The identification information stored in the NFC tag may be collected by an external control apparatus even before a lighting device is installed and power is provided thereto, to thus be used to generate settings data of a lighting device. Thus, convenience of installing a lighting system may be improved.

While example embodiments have been shown and described above, it will be apparent to those skilled in the art that modifications and variations could be made without departing from the scope of the present embodiments as defined by the appended claims.

What is claimed is:
1. A lighting system comprising:
  a plurality of lighting devices, each of the plurality of lighting devices comprising a controller configured to transmit and receive data by using near-field communication (NFC); and
  a control device configured to:
    collect identification information of the each of the plurality of lighting devices through the NFC prior to the plurality of lighting devices being installed, generate, based on the identification information, settings data to control the plurality of lighting devices, and transmit the settings data to the each of the plurality of lighting devices through the NFC.

2. The lighting system of claim 1, wherein the controller comprises a radio frequency (RF) circuit communicably connected to the control device to communicate through the NFC, and an RF memory having an encryption key for encoding data and storing encoded data.

3. The lighting system of claim 2, wherein the RF memory stores therein the identification information and the settings data.

4. The lighting system of claim 2, wherein the controller is further configured to encode the settings data, based on the encryption key stored in the RF memory, and store the settings data when the settings data is received from the control device.

5. The lighting system of claim 2, wherein the RF circuit and the RF memory are included in an NFC tag.

6. The lighting system of claim 1, wherein the control device is communicably connected to an external server storing installation information for the plurality of lighting devices.

7. The lighting system of claim 6, wherein the control device is further configured to map the identification information obtained from the each of the plurality of lighting devices to the installation information, to generate the settings data.

8. The lighting system of claim 1, wherein the settings data comprises at least one of grouping information for dividing the plurality of lighting devices into a plurality of groups, lighting scheme control information implemented by the plurality of lighting devices, and lighting zone control information for controlling operations of the plurality of lighting devices in each of subspaces in which the plurality of lighting devices are located.

9. The lighting system of claim 1, wherein the each of the plurality of lighting devices further comprises a light source including a plurality of light emitting elements, and a driving circuit outputting driving power to the light source, wherein the driving power is determined by the controller.

10. The lighting system of claim 9, wherein at least a portion of the plurality of lighting devices is communicatively connected to the controller, and comprises a sensor collecting at least one of external environmental information and information regarding operations of the plurality of lighting devices.

11. The lighting system of claim 9, wherein the controller is further configured to control the driving power that is output by the driving circuit based on the settings data.

12. The lighting system of claim 1, wherein the control device is at least one of a smartphone, a tablet computer, a wearable computing device, and a laptop computer.

13. The lighting system of claim 1, wherein the identification information of the each of the plurality of lighting devices is collected by an application program executed in the control device, and wherein the settings data is generated by the application program.

14. A lighting device comprising:
a light source including a plurality of light emitting elements;
a driving circuit configured to output driving power to the light source; and
a controller configured to control the driving circuit,
wherein the controller comprises a near-field communication (NFC) tag communicating with an external control device through NFC and storing predetermined identification information, and wherein the controller is further configured to transmit the predetermined identification information stored in the NFC tag to the external control device through the NFC prior to the lighting device being installed and the driving power being supplied to the light source, and when the controller receives a request for the predetermined identification information from the external control device.

15. The lighting device of claim 14, wherein the controller is further configured to transmit the predetermined identification information to the external control device through the NFC before power is supplied to the driving circuit, receive, from the external control device, settings data required to control the driving circuit, and store the settings data.

16. The lighting device of claim 14, wherein the NFC tag encodes the predetermined identification information stored in the NFC tag.

17. The lighting device of claim 14, wherein the NFC tag comprises a radio frequency (RF) circuit and an RF memory.

18. The lighting device of claim 14, further comprising a sensor communicably connected to the controller and collecting at least one of external environmental information and information regarding operations of the lighting device.

19. A control device for a lighting system, the control device comprising:
a near-field communication (NFC) module configured to receive identification information of each of a plurality of lighting devices and transmit settings data to the each of the plurality of lighting devices by using an NFC, when the plurality of lighting devices are in a state in which power is not supplied to the plurality of lighting devices;
a memory configured to store installation information for the plurality of lighting devices; and
a processor configured to generate the settings data by mapping the identification information to the installation information of the each of the plurality of lighting devices.

20. The control device of claim 19, wherein the NFC module is further configured to connect to an NFC tag included in the each of the plurality of lighting devices and store the identification information in an NFC passive communications mode.

* * * * *